(12) United States Patent
Radway

(10) Patent No.: US 8,807,055 B2
(45) Date of Patent: Aug. 19, 2014

(54) CONTROL OF COMBUSTION SYSTEM EMISSIONS

(75) Inventor: Jerrold E. Radway, Acworth, GA (US)

(73) Assignee: Clearchem Development, LLC, Henderson, NV (US)

( * ) Notice: Subject to any disclaimer, the term of this patent is extended or adjusted under 35 U.S.C. 154(b) by 499 days.

(21) Appl. No.: 13/135,440

(22) Filed: Jul. 5, 2011

(65) Prior Publication Data

US 2012/0090517 A1     Apr. 19, 2012

Related U.S. Application Data

(63) Continuation-in-part of application No. 12/151,131, filed on May 3, 2008, now Pat. No. 7,971,540, which is a continuation of application No. PCT/US2006/043219, filed on Nov. 6, 2006.

(60) Provisional application No. 60/733,936, filed on Nov. 5, 2005, provisional application No. 60/789,979, filed on Apr. 7, 2006.

(51) Int. Cl.
   *B01D 53/60*     (2006.01)
   *B01J 8/08*       (2006.01)
   *F23B 90/00*      (2011.01)

(52) U.S. Cl.
   USPC ............. 110/342; 110/203; 110/345; 241/21; 423/210; 423/230; 423/240 S; 423/244.07; 423/244.08

(58) Field of Classification Search
   CPC .............. F23G 5/34; F23J 1/00; C10L 1/1233
   USPC ............ 110/342, 203, 345; 241/21; 423/210, 423/230, 240 S, 244.07, 244.08
   See application file for complete search history.

(56) References Cited

U.S. PATENT DOCUMENTS

| | | | |
|---|---|---|---|
| 4,306,885 A | 12/1981 | Kober et al. | 95/60 |
| 4,322,393 A | 3/1982 | Gleason et al. | 423/243.02 |
| 4,555,996 A | 12/1985 | Torbov et al. | 110/345 |
| 4,559,211 A | 12/1985 | Feldman et al. | 423/243.01 |
| 5,284,637 A | 2/1994 | Merritt et al. | 423/244.07 |
| 5,518,980 A | 5/1996 | Lin | 502/400 |
| 6,206,685 B1 | 3/2001 | Zamansky et al. | 431/4 |
| 6,685,908 B1 * | 2/2004 | Yaniv | 423/432 |
| 6,997,119 B2 | 2/2006 | Radway | 110/343 |
| 7,276,217 B2 | 10/2007 | Radway et al. | 423/210 |
| 7,430,969 B2 | 10/2008 | Stowe, Jr. et al. | 110/345 |
| 2002/0102189 A1 | 8/2002 | Madden et al. | 422/168 |

(Continued)

OTHER PUBLICATIONS

Radway, J. E., "Effectiveness of Fireside Additives in Coal-Fired Boilers," *Power Engineering*, Apr. 1978, pp. 72-75.

(Continued)

*Primary Examiner* — Stanley Silverman
*Assistant Examiner* — Syed Iqbal
(74) *Attorney, Agent, or Firm* — Alfred J. Mangels

(57) ABSTRACT

A process for capturing undesirable combustion products produced in a high temperature combustion system in which a carbonaceous fuel is utilized. Very finely sized particles of alkaline earth carbonates or hydroxides, with or without added ground ash, are provided in slurry form and are injected into the high temperature zone of a furnace. The particles flash calcine to provide substantially unagglomerated particles having a particle size of less than about 0.5 microns to capture and neutralize $SO_x$, $NO_x$, and toxic metals present in the combustion products.

36 Claims, 8 Drawing Sheets

Solids

| Sorbent Type | Sorbent Size Microns | Injection Point | Capture %$SO_2$ | Lime Size Microns | BET Surface $M^2/gm$ |
|---|---|---|---|---|---|
| Limestone | 25 | Burner | 15.5 | 24 | 2 |
| Limestone | 25 | Furnace Exit | 19.2 | 20.4 | 2.8 |
| $Ca(OH)_2$ | 12 | Burner | 21.8 | 9.1 | 3.2 |
| $Ca(OH)_2$ | 12 | Furnace Exit | 23 | 4.2 | 5.9 |

Liquids

| Sorbent Type | Sorbent Size Microns | Injection Point | Capture %$SO_2$ | Lime Size Microns | BET Surface $M^2/gm$ |
|---|---|---|---|---|---|
| $CaCl_2$ | 20 to 30 | Burner | 30.7 | 43.5 | 2 |
| $CaCl_2$ | 20 to 30 | Furnace Exit | 26.1 | NA | |
| CaAc | 20 to 30 | Burner | 49.8 | 22.3 | 8.4 |
| CaAc | 20 to 30 | Furnace Exit | 29 | 26.5 | 5.1 |

(56) References Cited

U.S. PATENT DOCUMENTS

2004/0018133 A1* 1/2004 Radway ............... 423/244.05
2006/0106118 A1* 5/2006 Husband et al. ............... 516/78
2008/0286183 A1 11/2008 Radway ............... 423/212

OTHER PUBLICATIONS

Case, P. L., et al., "The Capture and Retention of Sulfur Species by Calcium Compounds During the Combustion of Pulverized Coal," Preprint, ACS Fuel Chemistry Division, vol. 27, 1982, pp. 158-166.

Dainoff, A. S. et al., "Mechanisms and Techniques for the MgO Treatment of Coal-Fired Utility Boilers," Engineering Foundation Conference on Fouling and Slagging from Impurities in Combustion Gases, Jul. 1984, 20 pp.

Landham, Jr. et al., "Guidelines for Particulate Control for Advanced $SO_2$ Control Processes," Electrical Power Research Institute, TR-104594, Dec. 1994, pp. iii, and 2-17 to 2-19.

Ghorishi, S. B. et al., "Preparation and Evaluation of Modified Lime and Silica-Lime Sorbents for Mercury Vapor Emissions Control," EPRI/DOE/EPA Combined Utility Air Pollutant Control Symposium, Aug. 1999, pp. 19-43 to 19-57.

Nolan, Paul S., "Flue Gas Desulfurization Technologies for Coal-Fired Power Plants," Coal-Tech 2000 International Conference, BR-1709, Nov. 2000, pp. 1-13.

Galbreath, Kevin C. et al., "Formation and Chemical Speciation of Arsenic-, Chromium-, and Nickel-Bearing Coal Combustion $PM_{2.5}$," Energy and Environmental Research Center, University of North Dakota, *Fuel Processing Technology* vol. 85, Jun. 2004, Abstract only, 1 page.

Galbreath, Kevin C. et al., "Trace Element Partitioning and Transformations During Combustion of Bituminous and Subbituminous U.S. Coals in a 7-kw Combustion System," *Energy and Fuels*, 2000, Abstract only, 1 page.

International Search Report, issued by the International Searching Authority /US, in PCT/US2012/045540, 2 pages, dated Sep. 18, 2012.

Written Opinion of the *International Searching Authority*, issued by International Searching Authority /US, in PCT/US2012/045540, 8 pages, dated Sep. 18, 2012.

\* cited by examiner

EFFECT OF PARTICLE SIZE ON SURFACE AREA AND NUMBER OF PARTICLES
| Particle Diameter -- microns | Surface Area per unit weight relative to 44 microns (325 mesh) | Number of Particles per unit weight, relative to 44 microns |
|---|---|---|
| 44 | 1 | 1 |
| 20 | 2.2 | 11 |
| 10 | 4.4 | 85 |
| 2 | 22 | 10,600 |
| 0.5 | 88 | 676,000 |
FIG. 3
Large particle forms CaSO₄ shell around CaO core
Small particle reacts more completely
Fig. 5

PARTICLE SIZE, SPECIFIC SURFACE AREA, AND EMLEY PLASTICITY DATA OF 25 DIFFERENT COMMERCIAL HYDRATED LIMES

| Lime No. | Emley Plasticity Value | Geometric Weight-Mean Diameter - microns | Geometric Standard Deviation | Specific Surface - $m^2/g$ |
|---|---|---|---|---|
| 1 | 60 | 6.0 | 1.9 | 0.50 |
| 2 | 80 | 4.2 | 3.1 | 1.20 |
| 3 | 80 | 4.6 | 2.7 | 0.90 |
| 4 | 80 | 5.6 | 2.2 | 0.60 |
| 5 | 80 | 5.8 | 2.4 | 0.70 |
| 6 | 80 | 6.0 | 2.2 | 0.50 |
| 7 | 110 | 4.4 | 2.5 | 0.90 |
| 8 | 120 | 3.3 | 3.0 | 1.40 |
| 9 | 120 | 5.4 | 2.2 | 0.70 |
| 10 | 140 | 3.7 | 6.1 | 3.60 |
| 11 | 220 | 7.4 | 3.9 | 0.90 |
| 12 | 240 | 7.8 | 3.4 | 0.70 |
| 13 | 280 | 4.0 | 2.5 | 0.90 |
| 14 | 300 | 5.0 | 3.4 | 1.10 |
| 15 | 310 | 6.6 | 3.6 | 0.80 |
| 16 | 320 | 7.2 | 2.8 | 0.60 |
| 17 | 400 | 6.3 | 2.8 | 0.70 |
| 18 | 400 | 7.2 | 4.9 | 1.20 |
| 19 | 410 | 7.5 | 4.5 | 1.00 |
| 20 | 420 | 5.2 | 2.9 | 0.80 |
| 21 | 420 | 6.8 | 4.4 | 1.00 |
| 22 | 480 | 4.1 | 3.0 | 1.10 |
| 23 | 490 | 3.0 | 10.5 | 11.00 |
| 24 | 550 | 4.9 | 2.6 | 0.80 |
| 25 | 600 | 2.9 | 2.1 | 1.10 |

FIG. 4

| Rank | Low Volatile Bituminous | High volatile Bituminous | | | | Sub-bituminous | Lignite |
|---|---|---|---|---|---|---|---|
| Seam | Pocahontas No. 3 | No. 9 | Pittsburgh | No. 6 | | | |
| Location | West Virginia | Ohio | West Virginia | Illinois | Utah | Wyoming | Texas |
| Ash, dry basis, % | 12.3 | 14.10 | 10.87 | 17.36 | 6.6 | 6.6 | 12.8 |
| Sulfur, dry basis, % | 0.7 | 3.30 | 3.53 | 4.17 | 0.5 | 1.0 | 1.1 |
| Analysis of ash, % by wt. | | | | | | | |
| $SiO_2$ | 60.0 | 47.27 | 37.64 | 47.52 | 48.0 | 24.0 | 41.8 |
| $Al_2O_3$ | 30.0 | 22.96 | 20.11 | 17.87 | 11.5 | 20.0 | 13.6 |
| $TiO_2$ | 1.6 | 1.00 | 0.81 | 0.78 | 0.6 | 0.7 | 1.5 |
| $Fe_2O_3$ | 4.0 | 22.81 | 29.28 | 20.13 | 7.0 | 11.0 | 6.6 |
| CaO | 0.6 | 1.30 | 4.25 | 5.75 | 25.0 | 26.0 | 17.6 |
| MgO | 0.6 | 0.85 | 1.25 | 1.02 | 4.0 | 4.0 | 2.5 |
| $Na_2O$ | 0.5 | 0.28 | 0.80 | 0.36 | 1.2 | 0.2 | 0.6 |
| $K_2O$ | 1.5 | 1.97 | 1.60 | 1.77 | 0.2 | 0.5 | 0.1 |
| Total | 98.8 | 98.44 | 95.74 | 96.20 | 97.5 | 86.4 | 84.3 |

FIG. 6

Comparison of ash from two lignites with wood ash

| | Lignite-type Ash | Lignite-type Ash | Wood Ash |
|---|---|---|---|
| Ash, dry basis, % | 5.0 | 6.0 | 1.0 |
| Sulfur, dry basis, % | 1.0 | 1.0 | 1.0 |
| Analysis of ash, % by wt. | | | |
| $SiO_2$ | 17.9 | 18.9 | 33.8 |
| $Al_2O_3$ | 13.2 | 19.5 | 2.6 |
| $TiO_2$ | 0.5 | 0.6 | 0.2 |
| $Fe_2O_3$ | 6.0 | 6.4 | 1.6 |
| CaO | 59.7 | 40.8 | 56.5 |
| MgO | 2.0 | 12.7 | 4.7 |
| $Na_2O$ | 0.2 | 1.0 | 0.5 |
| $K_2O$ | 0.5 | 0.1 | 0.1 |
| Total | 100.0 | 100.0 | 100.0 |

FIG. 7

Solids

| Sorbent Type | Sorbent Size Microns | Injection Point | Capture %$SO_2$ | Lime Size Microns | BET Surface $M^2/gm$ |
|---|---|---|---|---|---|
| Limestone | 25 | Burner | 15.5 | 24 | 2 |
| Limestone | 25 | Furnace Exit | 19.2 | 20.4 | 2.8 |
| $Ca(OH)_2$ | 12 | Burner | 21.8 | 9.1 | 3.2 |
| $Ca(OH)_2$ | 12 | Furnace Exit | 23 | 4.2 | 5.9 |

Liquids

| Sorbent Type | Sorbent Size Microns | Injection Point | Capture %$SO_2$ | Lime Size Microns | BET Surface $M^2/gm$ |
|---|---|---|---|---|---|
| $CaCl_2$ | 20 to 30 | Burner | 30.7 | 43.5 | 2 |
| $CaCl_2$ | 20 to 30 | Furnace Exit | 26.1 | NA | |
| CaAc | 20 to 30 | Burner | 49.8 | 22.3 | 8.4 |
| CaAc | 20 to 30 | Furnace Exit | 29 | 26.5 | 5.1 |

Fig. 8

SO₂ Capture vs. Stoich. Ratio and Injection Point

| Targeted Stoich. Ratio | SO₂.Capture % Equal Feed to All Four Ports | SO₂.Capture % 75% Feed to OFA Ports |
|---|---|---|
| 0.55 |  | 40.5 |
| 1 | 30.7 |  |
| 1.29 | 41.1 |  |
| 1.3 | 38.2 | 32.7 |
| 1.6 | 44.8 | 54.1 |
| 1.6 | 46.7 | 57.4 |
| 1.6 | 45 | 51.4 |
| 1.6 | 47.5 | 45.5 |
| 1.6 | 58.2 |  |
| 1.6 | 53.8 |  |
| 1.81 |  | 51.2 |
| 1.9 | 63.7 | 53.7 |
| 1.9 | 52.5 |  |
| 2.2 | 54.1 |  |
| 2.2 | 63.3 |  |

Fig. 10

CONTROL OF COMBUSTION SYSTEM EMISSIONS

CROSS-REFERENCE TO RELATED APPLICATIONS

This application is a continuation-in-part of copending U.S. application Ser. No. 12/151,131, filed on May 3, 2008; which is a continuation of International Application Serial No. PCT/US2006/043219, filed on Nov. 6, 2006; which claims priority from U.S. Provisional Application Ser. No. 60/733,936, filed on Nov. 5, 2005, and from U.S. Provisional Application Ser. No. 60/789,979, filed on Apr. 7, 2006.

BACKGROUND OF THE INVENTION

1. Field of the Invention

The present invention relates to processes for improved operation of coal-fired and other carbonaceous fuel-fired industrial and electrical utility boilers, incinerators, and high temperature combustion reactors. More particularly, the present invention relates to cost-effective processes for reducing undesirable and noxious stack emissions from coal-fired and other carbonaceous-fuel-fired combustion systems, for reducing the fouling of combustion system components, for reducing the emissions of acid and of greenhouse gases (GHG's), $CO_2$ and $H_2O$, and for reducing corrosion within such combustion systems.

2. Description of the Related Art

In coal-fired power generating plants, as well as in other industrial processes involving the combustion of carbonaceous fuels, a number of the products of the combustion process include compounds that have an adverse influence on boiler operation, or the compounds are environmentally undesirable and the discharge of which into the environment is subject to environmental regulations. Such compounds include sulfur oxides ($SO_x$), nitrogen oxides ($NO_x$), hydrochloric acid, and such heavy metals as mercury, arsenic, lead, selenium, and cadmium. Additionally, a significant number of nations, including the European Union and Japan, have taken steps to further limit the emissions of carbon dioxide ($CO_2$). Similar steps have been proposed in the United States but are currently being implemented by few of the 50 states. Water vapor is also perceived to be a GHG, but to date there have been no proposals to regulate emission levels.

In order to meet environmental limitations affecting the discharge into the atmosphere of the most prevalent of the most widely regulated compounds, sulfur dioxide ($SO_2$), combustion products from such plants and processes are commonly passed through capital-intensive flue gas desulfurization (FGD) systems, which are downstream from the furnace and tend to be economically feasible only on newer, larger combustion systems. The treatment of flue gases to capture $SO_2$ is often effected in lime- or limestone-based wet scrubbers, in which lime or limestone slurries are introduced into the flue gas stream to contact the flue gases before they are discharged into the atmosphere. The $SO_2$ is chemically converted in the scrubbers into insoluble calcium compounds in the form of calcium sulfites or calcium sulfates. The $SO_2$ contained in such combustion products is thus converted into less-environmentally-harmful compounds that either are disposed of in landfills, or, when suitably modified or treated, are sold as marketable chemicals as a result of their conversion into marketable gypsum. Interest in exploration of "dry scrubbers" is increasing because the wet systems produce a liquid by-product stream that requires treatment before discharging. The dry systems are somewhat less capital intensive than wet processes and treat the flue gas upstream of the dust collectors.

Although useful for converting some of the sulfur oxides, the widely-used types of wet lime/limestone scrubbers are not very effective in capturing the 1% to 1.5% of the sulfur in the fuel that is transformed during the combustion process into gaseous sulfur trioxide ($SO_3$), most of which can escape from the scrubbers. The $SO_3$ that is discharged poses environmental problems in that unless it is captured or transformed, the $SO_3$ results in a persistent, visible plume in the form of a corrosive and a potentially hazardous sulfuric acid mist. The historic solution to the $SO_3$ operational problems has been to minimize them by discharging the flue gas at temperatures above the acid dew point in the 300° F. to 340° F. range, which involves not utilizing as much as 5% of the energy in the fuel.

Further complicating the $SO_3$ capture problem, selective catalytic reactors (SCR's), which are installed primarily in the larger, newer plants to comply with nitrogen oxide emission regulations, essentially cause a doubling of the amount of $SO_3$ that is generated. Consequently, the already serious operational and environmental problems caused by the presence of $SO_3$ are magnified. Further, a new fouling problem within the SCR's is created in the form of sticky ammonium bisulfate deposits. In that regard, the slight excess of $NH_3$ used within the SCR's to eliminate $NO_x$ reacts with the $SO_3$ to form the sticky ammonium bisulfate. The historically applied solution for minimizing $SO_3$ by discharging the flue gases above the acid dew point also results in the emission of additional $CO_2$, the greenhouse gas the discharge of which is regulated in some parts of the nation and the world. That solution to minimizing the $SO_3$ problems burns as much as 5% more fuel to generate useful energy.

The $SO_3$ emission problem has been addressed chemically using a variety of alkaline chemicals (wet and dry), including lime hydrate, limestone, MgO, $Mg(OH)_2$, and Trona, that are injected into the system at different intermediate and downstream points in the flue gas flow path. For example, lime or limestone injected near the exit of the radiant furnace to capture $SO_2$ can be effective in capturing essentially all of the $SO_3$, because such a large excess of lime or limestone is needed to scavenge the $SO_2$, and because the $SO_3$ is more readily captured by those chemicals. The MgO and $Mg(OH)_2$ are effective in capturing $SO_3$, but are ineffective in scavenging $SO_2$. To avoid contributing to slagging problems the sodium-based additives are only applied downstream. However, the commercial −325 mesh powders that are generally utilized, which have a median particle size of about 20 microns when injected into the upper furnace, tend to magnify boiler tube ash deposit problems, and they also increase the quantity of particulates that are discharged from the boiler and that can escape through the electrostatic precipitators (ESP's). The deposit problems are the result of the 20 micron-size particles impacting the boiler tubes and other furnace inner surfaces, while the finer particles, about 5 micron size or finer, act like gas molecules and tend to flow around the boiler tubes, to thereby avoid impact with and to bypass the boiler tubes.

The unfavorable particle collection efficiency in the electrostatic precipitators when −325 mesh lime or limestone is injected at the boiler exit is a result of the poor electrical properties of unreacted CaO that is not collected. The presence of unreacted CaO results from the high stoichiometric ratios of the treatment chemicals that are needed when utilizing the relatively coarse −325 size powders. The same particulate collection and discharge problem is also encountered when lime or lime hydrate is injected in powder form into the lower temperature region of the flue gas path downstream of the furnace. On systems including scrubbers for capturing particulates, the precipitator problem can be circumvented by injecting the lime downstream of the precipitator. However, the downstream distribution of the relatively coarse −325 mesh powders results in relatively inefficient $SO_3$ capture, necessitating dosage at several times stoichiometric. Further, the injection downstream of the ESP of slurries that include micron-sized particles pose serious problems due to insufficient drying conditions and the consequent buildup of deposits in the flue gas ducts, because the low temperatures at that point do not provide the evaporative driving force that is needed to quickly flash off the water.

Sodium compounds, such as the bisulfite, carbonate, bicarbonate and carbonate/bicarbonates (Trona) compounds, have also been injected into the cooler regions of the system to capture $SO_2$, and are also effective in $SO_3$ capture. However, they pose material handling, ash disposal, and potential deposit problems. They also tend to have poor utilization efficiencies, which are somewhat improved when they are ground to finer (−400 mesh) particle sizes. The relatively coarse particles are prone to form an outer sulfate shell, thereby inhibiting utilization of the unreacted chemical inside the shell. Additionally, grinding of such materials is expensive, and it creates storage and handling problems because of the fineness and hygroscopic nature of the particles. Ash disposal issues also arise because of the solubility of sodium compounds, and in some cases steps to insure containment in the disposal ponds may be required.

Commercially available, but relatively expensive, oil-based magnesium additives can be effective in $SO_3$ capture. In that regard, one of the most effective chemical techniques for controlling both ash-related fouling in the boiler, and also the corrosion and emission problems associated with $SO_3$ generated in solid-fueled boilers, is the injection into the upper region of the boiler of oil-based slurries of MgO or $Mg(OH)_2$. That technology was originally developed for use with oil fired boilers, in which the magnesium-based oil suspension was usually metered into the fuel. It was later applied to coal-fired boilers. The most widely accepted mode of application of such additives today is by injection of slurries of MgO or $Mg(OH)_2$ into the boiler just below the region at which a transition from radiant heat transfer to convective heat transfer occurs. Though very effective for $SO_3$ capture when injected into the furnace, the magnesium compounds have no affinity for $SO_2$, and they are therefore not very useful for scavenging $SO_2$ within the furnace.

Although magnesium compounds are not effective for $SO_2$ capture, calcium compounds can serve as effective scavengers of both $SO_2$ and $SO_3$. Because both of the alkaline earths can be helpful in dealing with fouling, the resulting magnesium sulfate deposits are more soluble than their calcium counterparts, and are therefore easier to remove. Thus, the magnesium compounds are more widely used for addressing slagging and fouling. The deposit removal advantage of the magnesium compounds is lost when the more effective calcium reagent for $SO_x$ scavenging is of very fine form, because more of the slag mitigating reactions take place within the flue gas stream than on the boiler tube surfaces.

Another approach that has been utilized for $SO_3$ capture involves the use of so-called "overbased" organic-acid-neutralizing compounds of the type that are included as additives in motor oils and as fuel-oil-combustion additives. Those additives are actually colloidal dispersions of metallic carbonates, usually magnesium or calcium. When burned with fuel oil, they are effective at near stoichiometric dosage in capturing $SO_3$ and in mitigating ash deposits caused by vanadium and/or sodium in the oil. The colloidal dispersions are stabilized by carboxylic or sulphonate compounds and are known to provide mostly particles in the Angstrom range. Though very expensive, the "overbased" compounds are widely used at low dosages to capture vanadium in heavy-oil-fired combustion turbines. They have been utilized in $SO_3$ capture efforts, but there appear to have been no prior reports of their use for capturing either $SO_2$ or toxic metals. Although emissions benefits can be obtained by the use of the so-called "overbased" compounds, their much higher cost and their combustibility make them a less attractive option for most applications. Additionally, the combustibility of the overbased materials requires hard piping as well as additional safety devices, each of which involves increased costs.

In addition to their use in oil-based slurries, $Mg(OH)_2$ powders and water-based slurries have also been utilized as fireside additives in boilers, but because of their generally coarser particle size they are less efficient in capturing the $SO_3$. Water slurries of MgO have also been injected through specially modified soot blowers installed on oil- and kraft-liquor-fired boilers, in which they moderated high temperature deposits but had only a nominal impact on $SO_x$-related emissions because of an inability to apply the chemicals continuously.

In addition to regulations limiting $SO_x$ emissions, regulations aimed at limiting mercury emissions from coal-fired boilers have been promulgated by regulatory authorities, and proposed regulations applicable to the capture of other toxic metals are pending. A considerable amount of research aimed at finding practical techniques for capturing such toxic metals has shown that high-surface-area solids can capture a significant portion of mercury by adsorption, if the mercury is in an oxidized form rather than in an elemental form. Research was reported by Ghorishi, et al. ("Preparation and Evaluation of Modified Lime and Silica-Lime Sorbents for Mercury Vapor Emissions Control," EPA Energy Citations Database, Document No. 698008, Nov. 1, 1999) relating to mercury capture utilizing calcium silicates and hydrated lime ($Ca(OH)_2$). That research emphasized the necessity of extensive surface area for reaction, which was provided by fine pores in the sorbents, but it was focused on avoiding or minimizing pore closure of the sorbents by including suitable additives. It also noted that it was necessary to minimize the presence of $SO_2$, because the $SO_2$ competes with the Hg for the available capture surface of the sorbent, and when it is present the $SO_2$ reduces the effectiveness of Hg capture.

Oxidants, either added to or naturally present in the fuel, such as chlorides, can facilitate the oxidation of the mercury. Although high-surface-area lime can be effective in mercury capture, the commercially-available powders can be difficult to consistently deliver into the boiler. They result in operational problems within the boiler in the form of ash deposits, and they can result in increased stack emissions because of the unfavorable electrical properties of any unreacted lime. To date, the most widely accepted way to achieve mercury capture has been the injection of expensive activated carbons into the cooler regions of the boiler gas path.

Combustion systems requiring additional emission control generally fall into two broad, size-based groups. The first group includes large systems that are sufficiently new and can economically justify the large capital investment needed for scrubbers for $SO_2$ and for selective catalytic reactors (SCR's) for $NO_x$. That first group commonly encounters problems in the form of $SO_3$ plumes, because the scrubbers do not effectively capture that pollutant. Furnace Sorbent Injection (FSI) is a particularly useful option because it not only deals with the $SO_3$ plume problem, but it also captures the arsenic that can damage the SCR catalyst, it enhances mercury capture, which would otherwise be inhibited by competition with $SO_2$ for the available reactive surface area, it allows lowering the flue gas exit temperatures, which can boost energy efficiency, and it allows the scrubber to capture the greater quantities of $SO_2$ in order to comply with ever tighter emissions standards.

The second group of combustion systems includes those systems that are older and smaller, for which scrubbers and/or SCR's are difficult to physically retrofit, and that involve a major capital investment that is often difficult to justify economically. In that second group of systems, $SO_2$ emission regulations have been met by switching to more costly, lower-sulfur fuels, and, more recently, by utilizing market-based emissions credits. Combustion process modifications have also been used successfully to reduce $NO_x$ emissions, but the reduction is often insufficient to bring the systems into full compliance with the latest regulations.

As a result of combustion system modifications that are aimed at minimizing $NO_x$ formation, those older, smaller systems can also generate a byproduct ash that is higher in unburned carbon. The efficiency loss as a result of the increased unburned carbon is small, typically less than about 0.5% of the fuel carbon, but if the amount of unburned carbon in the ash is too high (>5% of the ash), the ash becomes unmarketable, thereby converting a potential revenue stream from the sale of ash into an expenditure for ash disposal. Considerable work has gone into efforts to optimize the burners of such systems, but with only limited success. The present inventor has published data showing a significant reduction in unburned carbon when a large number of fine magnesium oxide particles are produced by injecting submicron magnesia into the superheater region of the upper furnace, both with and without ash reinjection ("Effectiveness of Fireside Additives in Coal-Fired Boilers," *Power Engineering*, pages 72-76, April 1978). The treatment rates were sufficient to treat only $SO_3$, and similar results would be expected with similarly-sized calcium or aluminum compounds.

Some of the smaller, older combustion systems tend to use selective non-catalytic reduction (SNCR), which utilize reactions similar to those of the SCR's by using ammonia or an amine, but without the catalysts. Both of those control technologies result in a small amount of ammonia in the flue gas downstream of the SNCR or SCR systems, and the ammonia can react with the $SO_3$ that results either from the combustion process or from catalysis by the SCR itself, to form low-melting-point ammonium bisulfate, which can foul air pre-heaters that are further downstream in the flue gas flow path. The ammonium bisulfate problem can be mitigated by the injection of fine calcium compounds upstream of the air heater.

Both groups of combustion systems are likely to be required to conform with additional regulations that require the capture of trace quantities of toxic metals. Despite gas scrubbing, the scrubber/SCR-equipped systems that utilize higher sulfur content fuels also face a new, stack-opacity problem that results from a doubling by the SCR's of the $SO_2$ that is catalyzed to $SO_3$ and is emitted as a visible, sulfuric acid mist plume. The acid mist in the flue gas also results in system operating problems by plugging and corroding lower temperature components of the system.

The sulfuric acid plume problem has resulted in major environmental public relations issues for utilities, as evidenced by American Electric Power Company's purchase of the town of Cheshire, Ohio, because of acid mist discharge issues from its SCR-equipped wet scrubbers. The U.S. Department of Energy has spent millions of dollars in testing various $SO_3$ control techniques, and a variety of acid-neutralizing systems are being installed.

The $SO_3$ mitigation systems utilize a variety of alkaline chemical compounds that are injected at various points in the flue gas path, typically between the furnace exit and the ESP inlet, to effect the acid neutralization outside of the furnace. Most of those chemicals, including $Ca(OH)_2$, $Mg(OH)_2$, Trona, and SBS (sodium bisulfite), are relatively coarse in particle size. The finest-sized particles tested reportedly have a median particle size of about 3 microns. However, those chemical products are difficult to deploy, they are utilized at high rates that are 3 to 12 multiples of stoichiometric, and their use involves significant costs. Although the use of furnace injection of those coarser particles as an emissions control vehicle has been evaluated extensively, most current installations feed chemicals for both $SO_2$ and $SO_3$ control in the cooler section of the system at a point downstream of the SCR's, either as powder slurries, or solutions.

It is likely that the remaining boiler systems and combustion systems without scrubbers will soon need to meet more stringent $SO_2$ regulations or face early shutdown if a practical, low capital cost, moderate operating cost, pollution control system does not become available. Those same plants will soon also be required to capture mercury and other toxic metals, as well as to deal with more stringent $SO_x$ and year-round $NO_x$ emission limitations.

Considerable research has been conducted on techniques for capturing the toxic metal pollutants before they can escape from the combustion system and/or damage the SCR catalyst. That research has shown that the injection at various points in the boiler, including on the coal, at the furnace exit, and at the economizer outlet, of larger-sized minerals (−¾" to −325 mesh), high-surface-area high-porosity particulate materials, such as specially modified CaO, silicates, MgO, or activated carbon, can help to capture most of the metals. Heavy metals (Hg, Se, and As) capture has been shown to be significant when lime is injected at the furnace exit (2000° F. to 2200° F. temperature region) at twice the sulfur stoichiometric ratio, even though the surface area of the injected materials is relatively modest, of the order of about 1 to 4 $m^2/gm$ or more, and even though competition exists for that same reagent/reactant surface area by the acid-forming gases. The current regulatory focus is on the capture of mercury, and the current user focus is on injection into the cooler regions of the boiler of expensive, high-surface-activated carbon. However, the adverse operating and environmental impacts of the other toxic metals likely will lead to emissions regulations affecting their discharge, and more research into suitable scavenging reagents.

With regard to the capture of toxic metals and $SO_3$, the University of North Dakota Energy and Environmental Research Center reported that the tiny fraction, less than about 1.5%, of sub-micron size ash particles that are present in ash have been found to adsorb $SO_3$ ("Formation and Chemical Speciation of Arsenic-, Chromium-, and Nickle-bearing Coal Combustion," Fuel Processing Technology, vol 85, issues 6-7, pages 701-726, Jun. 15, 2004). It suggested that the fraction of those particles is important for controlling the $SO_3$ problem. The addition of fine alkaline materials (under 5 microns) was also mentioned. Other workers have reported that ash will adsorb toxic metals, but its low surface area leads to poor capture efficiency.

$SO_2$ control utilizing powdered limestone injection into the upper furnace region near the nose (2000° F. to 2200° F. temperature region), a technology known as LIMB (Limestone Injection Multistage Burner), has been investigated extensively since the 1970's. That work, summarized in a paper by Paul S. Nolan ("Flue Gas Desulfurization Technologies for Coal-Fired Power Plants," paper presented at the Coal-Tech 2000 International Conference, Jakarta, Indonesia, Nov. 13-14, 2000) also reported the focus on injection of reagents into the upper furnace region, near the furnace outlet (circa 2000° F. to 2200° F.), of more-expensive lime hydrate instead of limestone for $SO_2$ capture. Prior bench and pilot studies had concluded that the upper furnace region would be the location "where the sulfation reactions would be maximized," and noted that that location involved the sacrificing of additional reagent-to-flue gas contact time in order to avoid sintering of the lime particles. However; the LIMB approach has not been widely implemented because treatment rates twice stoichiometric with −325 mesh limestone powders (typical mean particle size of about 20 microns) captured no more than about 40% of the $SO_2$. The lime hydrate (about 12 micron median) was more effective, achieving about 65% $SO_2$ capture as shown in FIG. 7 of the Nolan paper, but that level of performance required a significant investment in a humidification system, boosting both capital and operating costs in terms of the energy needed to evaporate significant volumes of $H_2O$. It also dramatically increased the ash burden, by as much as double, and it posed deposit problems in the boiler convective pass requiring near-continuous operation of the soot blowers. It also overburdened the electrostatic particulate control devices because of the poor electrical properties of the unreacted lime.

Much of the previous research effort focused on the creation of high-porosity, high-surface-area CaO particles by flash calcination of the limestone in the upper furnace region. The failure to achieve the desired improvement in chemical utilization efficiency without introducing humidification has been attributed by EPA researchers to sintering of the CaO particles, but the current inventor's results of his testing, as viewed with a scanning electron microscope, suggest that the low utilization efficiency is most likely due to plugging of the pores of the high-porosity particles with $CaSO_4$, thereby reducing the accessible surface area for reaction and leaving a core of unreacted CaO. Some work with particle sizes in the 5 micron range has been reported, but that approach also has not been utilized commercially because of what is likely also to be a pore-plugging problem.

Thus far, the focus by others has been on adding excessive amounts of ground limestone (−325 mesh) having a median particle size of around 20 microns. The reason for that focus is that limestone is inexpensive, and even if one were to desire smaller particles, the normal mechanical size reduction techniques, such as grinding, for providing fine particle sizes, have all been judged by those facing the emission problem to be too expensive and economically unjustifiable.

Some research has been conducted on what might be described as a multi-pollutant control process, simulating the furnace injection of calcium and magnesium compounds slurried in solutions of nitrogen compounds. Theoretically, the combination would address all the emission issues except $CO_2$. Although the injection of nitrogen solutions to control $NO_x$ is in wide use on power boilers, the combination with calcium slurries for simultaneous $SO_2$ capture has not been commercially adopted. Reportedly, the failure to do so is the result of problems with settling and plugging in the slurry injection systems. To be effective, the $NO_x$ control systems inject the ammonia reagents near the nose of the furnace outlet, which is in the same temperature region called for by previous work using lime/limestone injection.

Reducing $CO_2$ emissions has thus far not been the subject of regulations in much of the world. Emphasis has been placed on improving efficiency of fuel use. And research on sequestering the $CO_2$ is ongoing, with some $CO_2$ captured, liquefied, and used in enhancing oil recovery. Most of the commercial $SO_x$ emissions control processes for fossil-fueled combustion systems employ limestone (directly or as lime) with the net result being a significant secondary emission of $CO_2$. The scrubbers employing limestone on the larger, newer units are the lowest emitters (about 0.7 tons $CO_2$/ton of $SO_2$ captured) while those using lime have net emissions at least twice as high because of the thermal loss in the calciners. Because the utilization of the limestone is so poor with conventional Furnace Sorbent Injection (FSI), the $CO_2$ released per ton of $SO_2$ captured is nearly 14 tons/per ton.

It is therefore an object of the present invention to provide improved multi-pollutant control processes while enhancing boiler operating conditions and efficiency.

SUMMARY OF THE INVENTION

Briefly stated, in accordance with one aspect of the present invention, methods are provided for mitigating high and low temperature deposits, for modestly increasing energy efficiency, for enhancing capture efficiency of existing scrubbers, and for reducing undesirable combustion system emissions, (primarily $SO_x$ and toxic metals, but also $CO_2$ and unburned carbon). Those results are achieved: (1) by using a soluble Ca compound such as calcium chloride, calcium acetate, or calcium formate; or (2) by preparing an essentially agglomerate-free, high-solids-content aqueous slurry containing $CaCO_3$ or $Ca(OH)_2$, particles having a particle size of about one to three microns or smaller, in which the aqueous slurry can be prepared using a calcium salt solution instead of water, to incrementally increase the concentration of the active compound; or (3) by the use of micron and submicron or nano-sized powders of solid calcium compounds; or (4) by formulating and co-injecting dispersions or solutions to include urea for $NO_x$ control, chlorides for Hg oxidation, or small quantities of alkali-type dispersants to enhance ESP performance.

As used herein, the term "lower furnace" means regions in which the temperature is from about 2500° F. to about 3000° F., and the term "upper furnace" means regions in which the temperature is from about 2000° F. to about 2200° F. Also as used herein, the terms "submicron" and "micron-sized" include particles as coarse as 3 microns and as fine as 70 nanometers.

The method of the present invention includes injecting the reagent into the boiler furnace near the burners, where the temperatures are in the 2500° F. to 3000° F. range. Those higher temperatures serve to rapidly flash calcine the calcium compounds to provide still smaller size calcium oxide particles. Another benefit of injection into the lower furnace region is that it results in as much as one-third more reaction time for allowing contact of the reagent particles with the flue gas. Thus, that higher temperature, lower furnace region is the preferred location for providing improved capture of $SO_x$ and of some of the toxic metals. The micron or nano-sized powders can either be blown into the lower furnace or applied on the coal belt ahead of the coal mills. Additionally, part of the reagent can be concurrently injected into cooler regions of the furnace to better capture other pollutants, such as HCl.

For liquid injection of the calcium compounds, the ratio of water to solids, the point of injection, the type of injector, and the injection pressure can be selected to minimize droplet size and thereby limit the agglomeration of the resultant oxide particles. The result is to maximize the number of individual, fine calcium oxide particles and the probability of contact of the calcium oxide particles with and therefore the capture of assorted pollutants. A preferred method of minimizing agglomeration and maximizing the number of discrete fine particles is to sequentially dry, mechanically deagglomerate agglomerates, and inject the sub-micron dispersions.

The slagging, fouling, and emission control benefits will be realized by simply injecting the necessary quantity of low and sub-micron reagents into the lower furnace to capture the acid-forming gases. The injection points are chosen based on computer modeling of the boiler flue gas flows in an effort to optimize reagent contact with and coverage of those flows. That approach enables an improvement in boiler and scrubber efficiency, which results from lowering the flue gas exit temperature. Part of the boiler thermal efficiency improvement can often be achieved with existing hardware, and even greater efficiency can be achieved by increasing the heat exchange surface area and by tuning the boiler by adapting the fuel delivery and combustion air to the change in flows and temperatures to deal with the additional energy being recovered.

The improvement in scrubber efficiency results from the reduction in the flue gas exit temperature, and therefore the flue gas volume, which increases the liquid-to-gas ratio within the scrubber, and also from the significant reduction in scrubber inlet $SO_2$ concentration. Water vapor, which like $CO_2$ is considered a greenhouse gas, is also reduced.

The very finely-sized calcium oxide particles that are produced within the furnace are sufficiently small that they are carried along with and follow the flow lines of the flue gas that contains the combustion products. Because of their very small size and very low weight, most of the particles act like gas molecules and flow with the flue gas around the heat exchange tube surfaces within the furnace, rather than impinging on the surfaces, as a result of which very little ash buildup occurs on those surfaces. The huge number of very small oxide particles increases the probability of collisions of individual calcium oxide particles with ash particles in the flue gas stream, which generally raises the melting point of the ash and thereby reduces the chances of the coarser ash particles being sticky enough to adhere to the heat exchange surfaces.

The present invention is also directed to:

1. the incorporation of minor amounts of alkali-type dispersants or high-melting-point alkali compounds to offset the adverse impacts on the ESP of any unreacted scavenging agents for capturing $SO_2$;

2. the addition of soluble alkaline earth halides (calcium and magnesium) to freeze-condition the dispersion and, when needed, to oxidize elemental mercury (Hg) to facilitate Hg capture. In that regard, alkali chlorides (sodium and potassium) are undesirable because they contribute to slagging and fouling;

3. when excess $NH_3$ is present from SCR's and SNCR $NO_x$ control systems, the mitigation of ammonium-bisulfate-based air heater fouling by preferentially scavenging the $SO_3$;

4. the provision of a simple, low cost method to extend the operating life of SCR catalysts by scavenging the damaging toxic metal arsenic;

5. the provision of a simple, low cost method to minimize total $CO_2$ emissions from emissions control systems;

6. the provision of a means for recycling industrial byproducts and wastes that may be sources of energy, and the sub-three-micron $CaCO_3$;

7. the provision of a cost effective way to restore the marketability of high LOI ash;

8. the provision of a low-capital and low-operating-cost method to upgrade older wet scrubbers to meet new, tighter emission regulations for $SO_2$ and $SO_3$;

9. the provision of a simple, low-cost method to reduce the amount of water that is evaporated in a wet $SO_2$ scrubber;

10. the provision of a simple, low-cost method to make an existing scrubber carbon-capture ready;

11. the provision of a simple, low-cost method for capturing $SO_3$ and toxic metals, and to eliminate the related visible $SO_3$ plume using coal ash alone, calcium compounds alone, or combinations thereof as the capture medium;

12. the provision of a dramatically lower-capital-cost system for capturing pollutants in fossil-fuel fired combustion systems than is currently commercially available with available hardware options, and one that has the potential to also fund the cost of the control arrangement through energy and operational cost savings; and 13. providing a low-capital-cost means to enhance the utilization and value of its existing and new investment in lime and limestone preparation.

In another aspect of the present invention, ash or other thermally stable minerals, particularly those with significant alkaline earth content, are ground, either dry or wet ground, to provide ash particles having a size of the order of about one to two microns or smaller. The finely-ground ash particles are injected, either alone or in combination with the alkaline earth slurries, in quantities and at locations in the flue gas path appropriate to the pollutant to be addressed, generally closer to the burners because that location provides more time for reaction of the particles with the combustion products. The injection location is not as critical for the capture of toxic metals, and their capture should be effective if injection occurs after the economizer. The use of ash is a less costly way to reduce undesirable emissions. Further, ash can be a partial substitute for calcium compounds or for activated carbon, and its contribution to overall process emissions of $CO_2$ is limited to that associated with the energy used to reduce particle size.

BRIEF DESCRIPTION OF THE DRAWINGS

The structure, operation, and advantages of the present invention will become further apparent upon consideration of the following description, taken in conjunction with the accompanying drawings in which:

FIG. 3 is a table showing the effect of particle size per unit weight upon the number of particles and their surface area;

FIG. 4 is a table showing particle size and surface areas for a number of commercially available hydrated limes;

FIG. 5 shows the effect of particle size on pollutant capture effectiveness;

FIG. 6 is a table showing the typical ash composition of representative U.S. coals;

FIG. 7 is a table showing a comparison of the ash composition of two lignites with wood ash;

FIG. 8 is a table showing both capture of $SO_2$ with various calcium sorbents when injected into a combuster at different temperatures, and the physical characteristics of the lime generated;

FIG. 10 is a table summarizing the $SO_2$ capture results when injecting sub-micron slurries of precipitated scalenhedral type crystals of $CaCO_3$, wet ground sub-micron $CaCO_3$, and milk of lime through several different ports of the furnace, selected based on computer modeling, of the flue gas flows in a 20 MW industrial coal-fired boiler.

DESCRIPTION OF THE PREFERRED EMBODIMENTS

Figure 1:
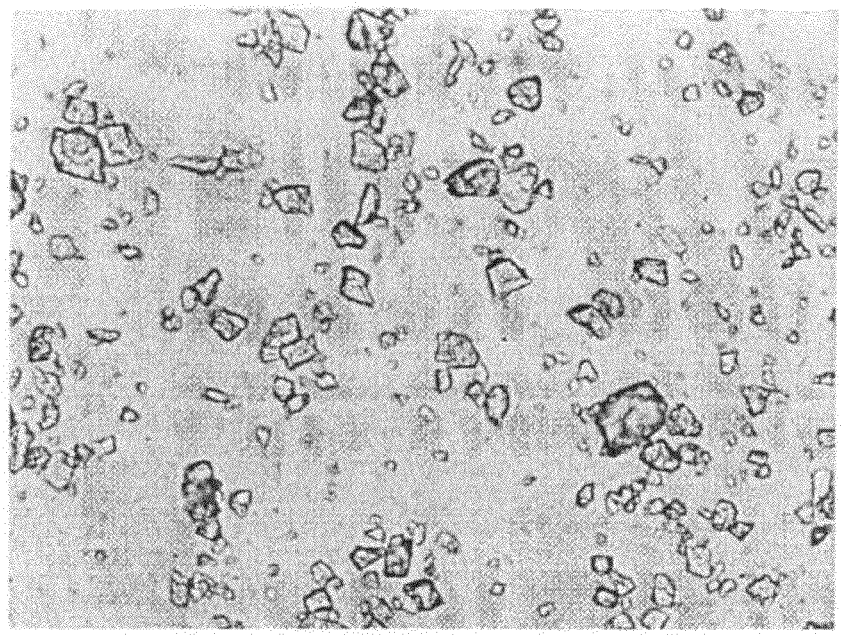
FIG. 1 is a photomicrograph showing the sizes of calcium carbonate particles that were employed by prior art processes.

The processes herein disclosed relate both to improving power plant thermal efficiency and to the capture of undesirable pollutants that result as products of the combustion process of carbonaceous fuels, particularly in coal-fired combustion systems such as those employed in industrial operations or in electrical power generating stations.

Among the pollutants that are more effectively captured as a result of practicing the processes of the present invention are $SO_2$, $SO_3$, and HCl, along with toxic metals, such as mercury, selenium, lead, and arsenic. In that regard, references herein to "toxic metals" includes all those that are of concern to regulators.

The processes in accordance with the present invention also relate to improving power plant thermal efficiency; to reducing fireside slagging, fouling, corrosion, and unburned carbon; to enhancing the pollutant capture performance of downstream scrubbers, if they are provided as a part of a furnace combustion system; and to reducing both the overall amount of $CO_2$ released in the course of capturing the other pollutants identified above, and enhancing the $SO_2$ capture efficiency sufficiently to make $CO_2$ capture simpler, less capital intensive, and less costly to operate.

Gains in power plant thermal efficiency result from the reductions in slagging and fouling of both high and low temperature heat exchange surfaces, to thereby improve the efficiency of heat transfer, from the extended life of SCR catalysts, and from the utilization of heat that would otherwise be wasted by discharging flue gases that are at temperatures above the sulfuric acid dew point. Enabling the lowering of flue gas exit temperature reduces flue gas volume and reduces fan horsepower requirements to move the flue gases, and scrubber efficiency is increased by raising the liquid-to-gas ratio and by reducing the magnitude of the $SO_2$ concentration at the inlet of the scrubber.

The processes in accordance with the present invention primarily involve the injection into the high temperature combustion zone of a furnace, where the temperature is in the range of from about 2500° F. to about 3000° F., of a particulate slurry or an aqueous solution of calcium compounds. The injected slurries or solutions first flash dry by exposure of the slurries to the high temperatures in the combustion zone to flash off the liquid, and the calcium compounds then immediately flash calcine into very small calcium oxide particles upon exposure to the high temperatures at the injection sites. The result of the slurry injection into the combustion zone is to provide a very large number of very finely-sized calcium oxide particles that have a particle size of about 1 to 2 microns, or even finer. The calcium oxide particles are largely present as distinct, individual, fine particles, as opposed to agglomerates, and they are readily available for intercepting and capturing the undesirable pollutants. Similarly finely-sized powders can also be injected, but they pose significant handling problems because of their fineness, and they require more capital intensive injection systems and a more expensive reagent. The handling issues can be mitigated by surface coating with an organic lubricant such as stearic acid, which is a technique used commercially to facilitate incorporation in plastics and rubber. If circumstances favor dry rather than wet processing, one of the two methods for commercially producing the very fine, micron-size powders involve wet grinding of high solids slurries, which is more cost efficient than dry grinding to that particle size range, followed by spray drying and mechanical milling to break up agglomerates that are formed in the spray dryer.

The very finely-sized calcium oxide particles that are produced within the high temperature combustion zone of the furnace are sufficiently small so that they are carried along with and follow the flow lines of the flue gas that contains the combustion products. The huge numbers of very finely-sized calcium oxide particles that are produced increases the probability of collisions of the calcium oxide particles with pollutant particles and with ash particles. Because of their very small size and resulting very low weight, most of the calcium oxide particles act like gas molecules and are carried by the flue gases as they flow around the heat exchange tube surfaces within the furnace, rather than impinging on the tube surfaces. As a result of the calcium oxide and ash particles being carried by the flowing flue gases, very little ash buildup occurs on the tube surfaces. For most, but not all, coal ashes the addition of lime will raise the melting point of the ash, which is the determinant of particle adhesion to furnace surfaces. Thus, the higher melting point of the ash particles reduces the chances of the ash particles being sticky enough to adhere to the heat exchange surfaces, and consequently the heat transfer across the heat exchange tube surfaces is not impeded by a buildup over time of ash on the outer surfaces of the tubes.

The primary sources of compounds for providing the finely-sized calcium oxide particulates include lime, limestone, and other calcium compounds that yield calcium oxide when exposed to high temperatures. A suitable suspension of calcium compounds in the form of an aqueous slurry can be prepared by finely grinding the solid calcium compounds in an aqueous medium. The fine grinding can be carried out in a media mill, or in another type of fine grind mill, to subject the solids to shear forces and to thereby reduce their size, to provide a resulting aqueous slurry containing finely ground, suspended solids having particle sizes of from one to two microns, or finer. The solids in such a slurry can typically have surface areas in the range of from about 4 $m^2$/gm to about 20 $m^2$/gm. The dispersion concentrations can range from about 20% to about 85% solids by weight, with a preferred concentration range of from about 50% to about 75% solids by weight. Generally, a relatively high solids concentration is preferred in order to minimize slurry weight, which affects shipping expense, and to minimize the amount of water that is introduced into the furnace with the solids and that consumes heat as a result of the vaporization of the water, which heat consumption reduces the thermal efficiency of the system. For perspective, a 75% solids slurry would add about one pound of water per pound of sulfur in the fuel, which compares to 10 to 15 pounds per pound for typical moisture for coal stored outdoors.

Handling properties and site-specific operating considerations can also influence the solids concentrations that are selected for a particular application. Important attributes of the slurry include a very fine calcium compound particle size, a substantially uniform dispersion of the particles within the aqueous medium, and an avoidance of as many as possible of larger-size agglomerates of the particles. Diluting the slurry to 20 or 30% solids is one means of minimizing agglomeration of the resulting calcium oxide particles after injection of the slurries or solutions into the furnace. Employing injection systems that deliver the slurry or solution as very fine droplets in the 5 to 10 micron range is another. Such injection equipment is offered in the form of atomizing nozzles by TurboSonic Technologies, Inc., of Parsippany, N.J., and by Spraying System Company of Wheaton, Ill.

The desired very fine particle size of the calcium compounds and the substantially uniform dispersion of the particles throughout the slurry are achieved in large volume commercial applications by grinding the calcium compounds in a media mill in the presence of a dispersant. One type of suitable media mill is available from Union Process Inc., of Akron, Ohio. Suitable dispersants that can be utilized in the grinding process include anionic surfactants and sodium salts of a polycarboxylic acid, or polyacrylates. Commercially available surfactants that are suitable include Acumer 9300, available from Rohm and Haas Company, of Philadelphia, Pa., or Darvan 7 or Darvan 811, available from R. T. Vanderbilt Company, Inc., of Norwalk, Conn. Dispersant concentrations in the slurry can be of the order of from about 0.20% to about 5% by weight. Acceptable results are obtainable with dispersant concentrations within the range of from about 0.25% to about 1.5% by weight. It should be noted that many wet-scrubber-equipped installations have excess wet ball mill capacity to make −325 mesh limestone slurries. That product can be an economic feed for the micron-sized slurry prepared on site by contractors with the special expertise to operate such a facility.

Another way to obtain the desired high-solids-concentration slurry that contains calcium compound particles having sizes of from one to two microns or finer is by precipitation. Such processes are also used in large volume commercial applications. They involve the preparation of a suspension having as raw materials metallic hydroxide, or oxide particles that are then solubilized, as the bicarbonate, and that are reprecipitated as carbonates. The raw material can be $Ca(OH)_2$, as well as calcium oxide. The suspension is subjected to a flow of $CO_2$ gas in the presence of an anionic surfactant, or of a salt of a carboxylic acid or a sulphonic acid. The $CO_2$ is bubbled through the slurry to react with the suspended materials to form a soluble compound, the bicarbonate, which is then decomposed to form the ultra-fine carbonate particles.

The slurries that are commercially produced by precipitation are also converted to micron-sized powders for some applications by spray drying, followed by mechanical milling to break up agglomerates that form during the drying process. Those extra steps add significantly to the relatively modest costs of slurry preparation, and they result in powders that can be difficult to handle and feed. Even so, there may be situations where the better performance of the micron-size powders can justify the higher cost, i.e., if the application is a facility with an existing under-performing powder injection system.

Those same particle size preparation steps, involving either grinding or solubilization and subsequent reprecipitation, can also be employed to prepare nano-size particles as fine as 70 to 400 nanometers. Such particles can be employed as scavenging reagents, either alone or in combination with micron-sized products to enhance capture performance. They can be used to provide high-lime-content ash, in which the lime content is of the order of at least about 5% of the ash by weight. They can also be utilized to process industrial wastes, such as lime waste from beet sugar processing, or water softening sludges for use as a pollutant scavenger in a combustion system. Some of those materials typically have an organic content, generally less than about 10% by weight, and when injected into the furnace provide some additional heating value to offset the heat decrease associated with evaporating the water contained in the aqueous reagents undergoing calcination.

The calcined, reduced-size calcium oxide particles that result when the calcium compounds are injected into the burner region of the furnace can be of a particle size of from about 0.07 microns to about 3 microns, preferably about 0.5 microns (500 nanometers) and finer. The external surface area of 0.5 micron particles is about 40 times that of a commercially available −325 mesh (20 micron) limestone particle. The calcination of such calcium compounds to that preferred particle size results in about 61,000 times as many calcium oxide particles per pound of material, as compared with the commercially available −325 mesh material. The result of the presence of such massive numbers of smaller CaO particles in the burner region of the combustion system will be the capture of as much as 84% or more of the $SO_x$, and up to 90+% of toxic metals, at a stoichiometric ratio of Ca/S of the sulfur content of the fuel of only about 1.5 times, or less.

Figure 2:
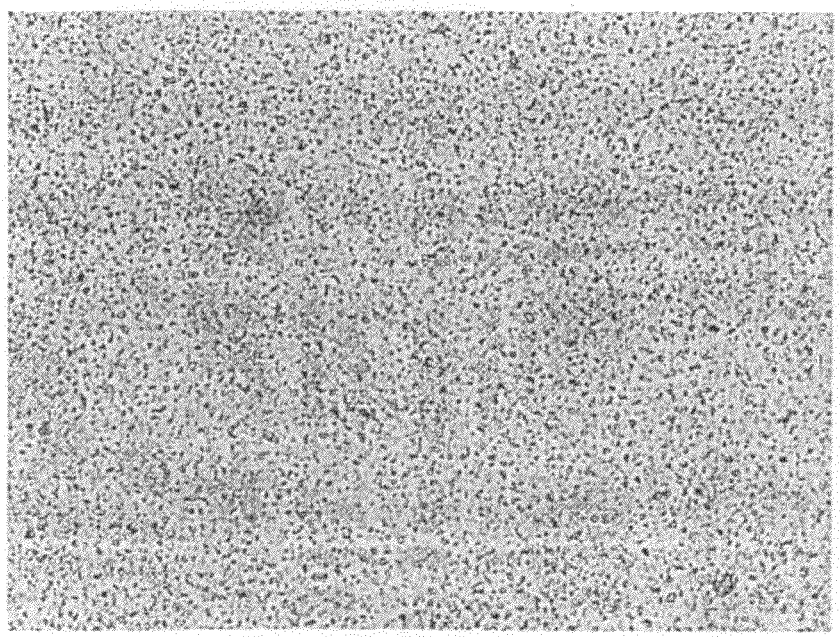
FIG. 2 is a photomicrograph showing the sizes of calcium carbonate particles that are produced by a process as described herein for producing very-finely-sized particles.

FIGS. 1 and 2 are photomicrographs that each represent an area having a width of 0.44 mm, to show the vast difference in the sizes of $CaCO_3$ particles depending upon the process utilized. FIG. 1 shows the sizes of $CaCO_3$ powder particles that result from the prior art processes that produce a product that is at the fine end of the range of commercially available offerings, generally denoted as −325 mesh (typically 20 micron median size), that result from commercially-ground, powdered limestone. In that regard, the agglomerates that can be seen in FIG. 1, although composed of a number of smaller particles, are effectively single, large, relatively heavy particles. The particles shown in FIG. 1 are of a finer size (median size of 9 microns) than most commercially available ground particles, which generally fall within the 20 micron median size range. Although the surface area and the pores of such commercially available particulate agglomerates have been recognized previously, it appears not to have been appreciated that in actual practice the pores of the agglomerates get plugged by reaction products or by other, smaller particles. Consequently, the effective exposed and available outer surface areas of the agglomerates for pollutant capture purposes is significantly reduced, leaving a core of unreacted lime.

FIG. 2 shows the powder particles that result from practicing the processes described herein that provide sub-micron size particles that are essentially agglomerate-free, having a median particle size of about 0.7 microns. The very low fraction of agglomerated particles is achieved by applying both shear and dispersant chemicals during the wet preparation of the sub- and micron-size stone, and by using spray injectors designed to minimize agglomeration of the dried/calcined particles.

The $SO_2$ concentrations in flue gases resulting from coal combustion are typically of the order of about 2,000 ppm. But the presence of a large number of other gas molecules, roughly 500 per molecule of $SO_2$, tends to impede the contact of a CaO particle with an $SO_2$ molecule. The toxic metals to be captured, such as Hg, Se, and As, are present in flue gases at much lower concentrations, of the order of parts per billion. Thus, reducing the particle size from 20 microns to 1 micron increases the number of $CaCO_3$ particles per pound by about 7800 times, which will significantly increase the probability of a resulting CaO particle finding and reacting with an $SO_2$ molecule, or an $SO_3$ molecule, or a toxic metal molecule in a space that is crowded with other molecules.

FIG. 3 is a table that dramatically shows the effect upon the outer surface area of the particles and upon the number of particles available for reaction of reducing the particle diameter. Because the large number of very finely-sized CaO particles that are produced in practicing the present invention act like gas molecules, they are carried along with and are subject to the same movements and random motions during flow as are other gas molecules that are present, thereby increasing the probability of contact with pollutant molecules. Clearly, increasing the probability of contact increases the probability of more complete reaction and more complete capture. Moreover, the fine size of the particles reduces the chances of a significant unreacted inner core of lime. The data shown in that table are significant in that they provide perspective on what can be accomplished to achieve high pollutant capture efficiency at reasonable stoichiometric sorbent dosages. Prior researchers did not deal with the fact that during handling and injection particle agglomeration results in larger particles having less effective surface area for pollutant capture. In that regard, pollutant capture is dependent upon contact between reagent particles and pollutant molecules, and it requires both pollutant molecules and reagent particles to be present in substantially the same space. Because pollutants are present in the flue gases at ppm and ppb concentrations, the probability of capture of a pollutant molecule by a reagent particle will be increased by maximizing the number of reagent particles that are present for reaction, which requires not only that the reagent particles be of a fine size, but also that they must be delivered in such a way that agglomeration of the finely-sized reagent particles is minimized in order to obtain the benefits of the present invention.

Another approach to increase overall chemical reagent utilization still further is to incorporate in the milled dispersion a small quantity, less than about 5%, of overbased calcium compounds, which at 0.005 microns (50 nanometers) contain countless particles per pound. The quantity added will be governed by economics and performance. Since overbased products are available in both oil- and water-based formulations, a surfactant will be needed to make the oil-based product compatible with the coarser water-based product.

The increase in available overall reagent particle surface area that results from particle size reduction, only a 40 fold increase, is not as dramatic as is the increase in the total number of available particles, but it is significant for pollutant capture performance since it is essentially all external surface area that is available for reaction. The problems reported in most of the prior work occurred where much of the available surface was internal surface area, within surface-connected pores of agglomerated particles. The pores were then plugged by $CaSO_4$ from the reaction of the CaO particles with $SO_2$, thereby preventing full utilization of the otherwise available surface area of the pollutant capture material.

FIG. 4 is a table that is adapted from a table presented in "Chemistry and Technology of Lime and Limestone," by Robert S. Boynton, $2^{nd}$ Ed., 1980, at page 340, and presents the specific surface in $cm^2/g$ rather than in $m^2/g$ for 25 commercial hydrated limes (multiply by $1\times10^{-4}$ to convert). That table shows the relatively large particle sizes and the relatively low specific surface values for a number of commercially available hydrated limes. Slurries of those hydrates can be reduced to the one to two micron range and de-agglomerated by employing milling of the particles and also by employing surfactants, as described above in the context of the present invention.

A further significant difference between the processes in accordance with the present invention and the previous approaches resides in the fact that the larger effective particle size of the agglomerated CaO particles that are present in the previous approaches to pollutant capture are likely to result in a significant fraction of those larger particles, having a size of over 4 or 5 microns, impacting on and thereby attaching to the surface of a heat exchange tube. As a result, those particles are effectively removed from the gas stream, and they are thus rendered less available for scavenging pollutant molecules during a significant part of the very short residence time that the calcined particles are within the upper region of the furnace. Additionally, the calcined particles that attach to the outer surfaces of the heat exchange tubes result in a coating on the surfaces of the tubes, thereby reducing the effectiveness of the heat transfer to the interior of the heat exchange tubes, and consequently reducing the overall operating thermal efficiency of the heat transfer system. In previous full-scale trials, operators found that to reduce heat exchange tube deposits it was necessary to operate the soot blowers nearly continuously, at a significant cost in the energy required to operate the system, and in greater equipment wear and tear.

FIG. 5 is a graphical depiction of the effect of CaO particle size on available surface area for effective pollutant capture. The larger particles characteristic of the previous approaches (shown in FIG. 5 by the upper particle) react with the combustion gases up to a point that is limited by the ultimate formation on the surface of the CaO particle of a $CaSO_4$ outer shell around an inner CaO core. The inner core portion is therefore no longer available for reaction with the pollutants contained in the combustion gases. The smaller CaO particles that are provided by the processes disclosed herein (shown in FIG. 5 by the lower particle), on the other hand, will result in a more complete reaction and therefore greater pollutant capture, by virtue of the exposure of the greater total surface area of the smaller particles to a larger volume of the combustion gases, because the greater number of smaller particles collectively present a significantly larger total surface area available for reaction before a reaction-limiting $CaSO_4$ shell is formed.

FIGS. 6 and 7 are two tables adapted from *Steam/Its Generation and Use*, $39^{th}$ edition, Section 15-2, published by The Babcock & Wilcox Company, 1978, showing the typical ash content and chemistry of some U.S. coals and lignites. They show that some forms of ash, particularly those in coals from the Western states, can be quite high in CaO. Therefore, if the ash particle size is reduced and is activated as disclosed herein, such materials can potentially be useful and economic sources of pollution control reagent, both for systems not having scrubbers as well as those having scrubbers. Clearly, reinjecting processed high calcium oxide ash would be more appropriate for injection in systems not having scrubbers, while similarly processed low calcium oxide ash would be useful to capture SO3 and toxic metals in systems having scrubbers.

EXAMPLE I

FIG. 8 summarizes experimental sorbent comparisons that were conducted on a natural-gas-fired pilot combustor firing at about 3.7 MBTU/hr. The gas was spiked with $SO_2$ to provide $SO_2$ concentrations in the combustion products ranging from a low of 425 ppm to 1155 ppm. Limestone and lime hydrate powders were compared with calcium acetate and calcium chloride solutions. Each of the sorbents was injected into the combustor at the burner location and also at the combustor exit, which correspond to temperatures at the burners and at the combustor exit of about 2750 F and 2200 F, respectively. All the sorbents were dosed to achieve Ca/S=2. Both of the solutions were injected using a two-fluid nozzle and captured significantly more $SO_2$ when injected at the burner location than did the solids in the form of powders, more than three times that of the limestone for the liquid calcium acetate and two times that of the limestone for the liquid calcium chloride. Those differences are somewhat understated as the $SO_2$ concentrations when utilizing the liquids were 400 ppm and 625 ppm, respectively, as compared with 850 ppm and 1,000 ppm when utilizing the powders. The probability of a reagent particle finding an $SO_2$ molecule in flue gas during the short reaction time in a boiler furnace decreases with pollutant concentration. Agglomeration of the calcium chloride derived lime prevented characterization of those solids.

The lower capture results with the powders tend to support the prior work of others, which involved injection of reagent at the lower temperatures that exist at the furnace exit, although the differences between the powders are small. However, the data for both of the liquids confirms that injection of reagent at the burner region is significantly more effective for capturing $SO_2$. The 49.8% and 30.7% $SO_2$ capture values for the liquid calcium acetate and the liquid calcium chloride injected at the burner region would probably have been even higher if a better injector had been available to minimize droplet size and to minimize agglomeration. The solids lime particles were either similar to or larger than the liquid droplet size, and plugging of the pores with gypsum is suspected, but was not verified.

EXAMPLE II

Figure 9:
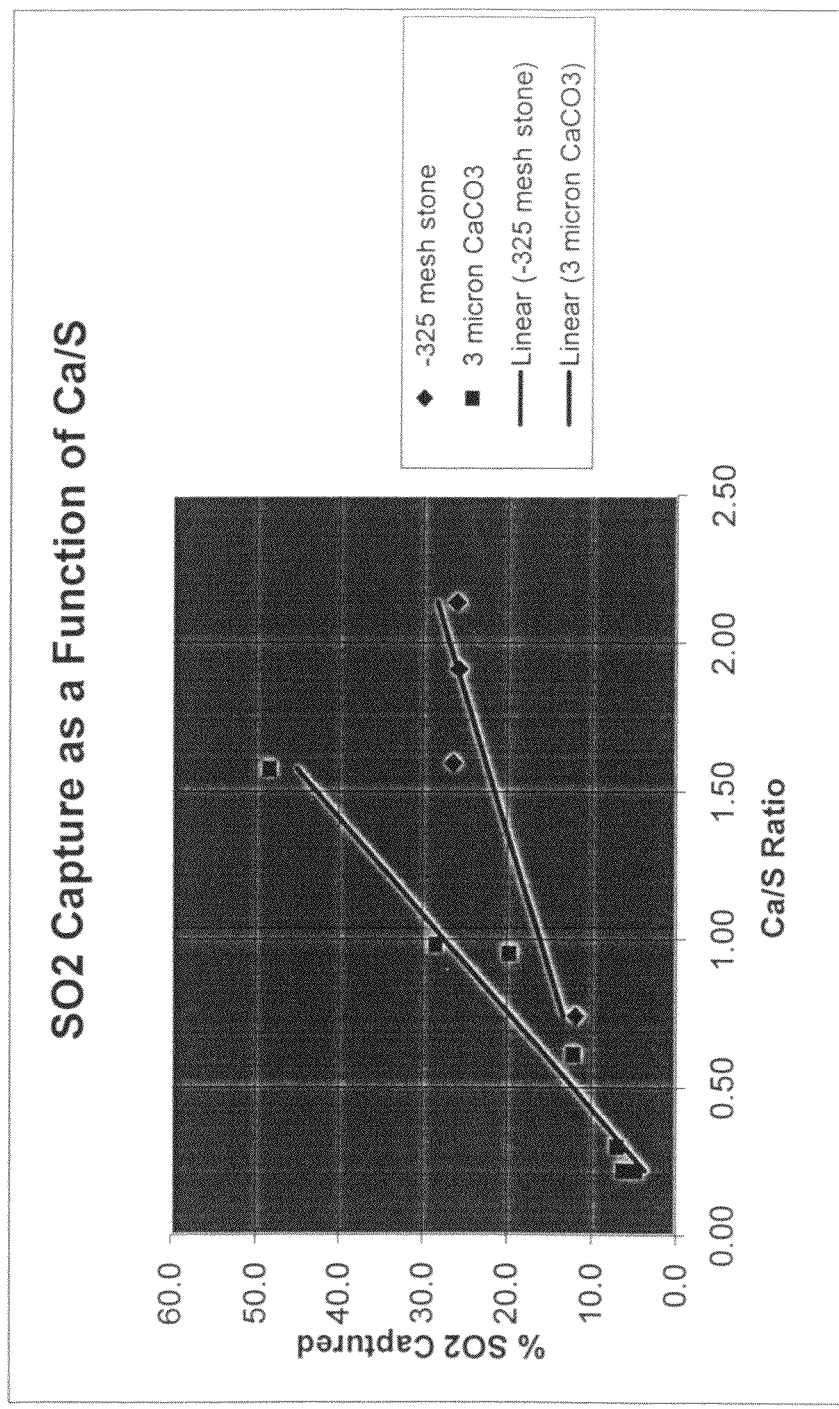
FIG. 9 is a graph comparing the $SO_2$ capture performance of 3 micron $CaCO_3$ powder with an unusually fine −325 mesh commercially ground limestone when injected into a 65 MW coal-fired boiler.

FIG. 9 shows that in tests from a 65 MW tangentially fired coal boiler, a 3 micron calcium carbonate powder captures double the $SO_2$ that is scavenged by an unusually fine −325 mesh limestone (9 micron median versus normal 20 micron) at a Ca/S ratio of 2. In those tests, about ¾ of the powder was injected through ports approximately midway between the furnace burners and the furnace exit, with the remainder of the powder delivered closer to the burners.

FIG. 9 shows the $SO_2$ capture results as a function of Ca/S ratio when 3 micron median $CaCO_3$ powder was injected into a 65 MW boiler firing 1.65% sulfur coal. The boiler was equipped with a Mobotec pneumatic powder injection system. The results show significantly better $SO_2$ capture performance for the 3 micron-size mechanically deagglomerated powder when compared with results utilizing an exceptionally finely-sized commercial −325 mesh product. That performance difference exceeded what had been assumed as sufficient to exceed the emission control targets of 50% $SO_2$ capture at a Ca/S ratio of below 2. Because the best results were obtained when about 25% of the powder was injected into the furnace at the higher temperature region, adjacent to the burners, those results, along with those shown in FIG. 8, clearly support the notion of feeding of the reagent close to the burners in order to provide improved $SO_2$ capture.

EXAMPLE III

FIG. 10 is a table summarizing the results of a series of tests on a 20 MW coal-fired boiler burning 1.8% sulfur coal. The results are of a series of short tests with slurries of micron-size ground calcium carbonate (GCC), milk of lime, and precipitated calcium carbonate (PCC). The crystals of the latter reagent were of a scalenhedral form (shaped like a child's "jack") that provides more exposed outer surface area for a given size particle, and is of a form that is more resistant to pore closing by the formation of gypsum at open regions of the crystals. The boiler was modeled for those tests, and four existing ports were chosen with the intent of feeding roughly equal quantities of the calcium dispersions through the four injection ports. Two steam-powered two-fluid injectors were mounted in the "over fired air" (OFA) ports, near the burners at the front wall, and two injectors somewhat higher at the rear wall. The rear wall locations were a compromise, because the preferred locations on the side walls per the modeling were inaccessible.

The resulting data in FIG. 10 show that the initial target of 50% capture at a Ca/S ratio of 2 could be achieved with uniform distribution of a 20% solids PCC reagent, but at a lower Ca/S ratio of 1.6. Experimentation in which about half of the reagent flow from the rear wall injectors was shifted to the OFA injectors led to the enhanced performance. That result was achieved despite the fact that the tested arrangement caused the OFA injectors to handle more than 200% of design flow, which probably resulted in coarser spray droplets, more agglomeration of the lime, and less than optimum utilization. However, when the OFA damper was opened to allow air to flow around the injector, capture performance improved leading to the conclusion that the flow had probably helped the injector deliver finer droplets. Although there is a wide range of capture shown for a given stoichiometric ratio, much of that variation can be attributed to the residual inventory of reagent in the furnace, which continued to perform even when injection was suspended. The tests with ground $CaCO_3$ (GCC) and milk of lime were too limited to make firm comparisons, but both appear to be only slightly less effective than the PCC.

Figure 11:
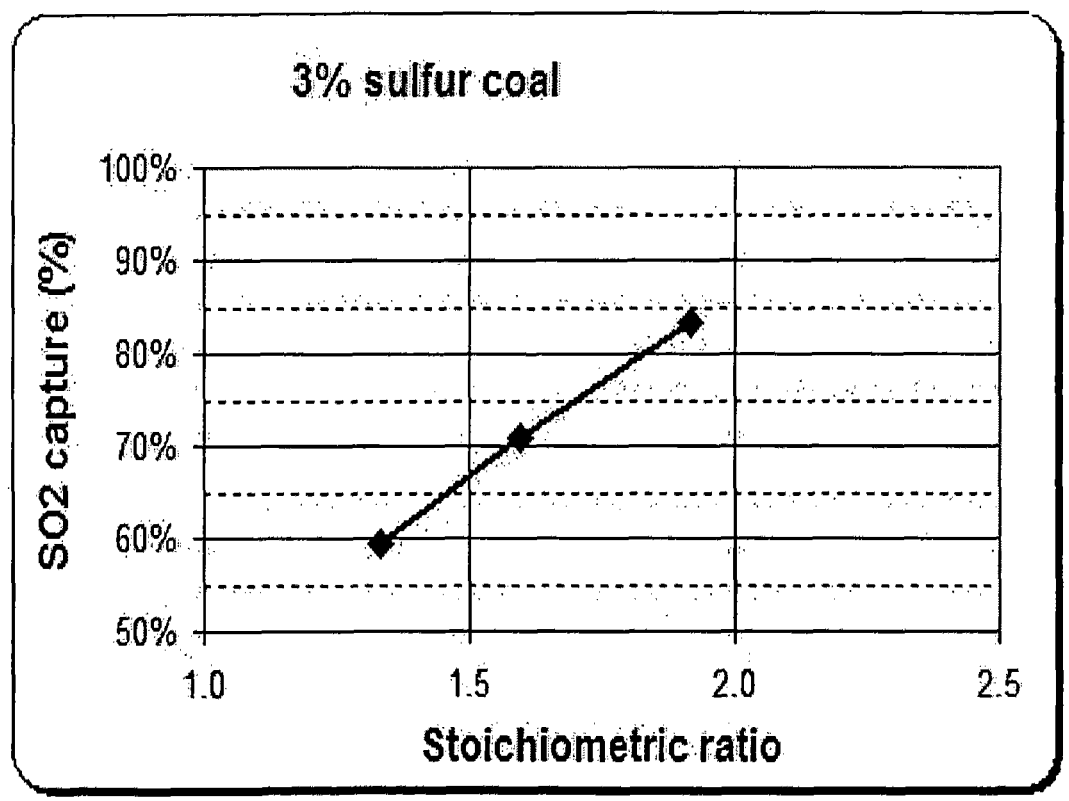
FIG. 11 is a graph showing $SO_2$ capture as a function of Ca/S ratios for 3% sulfur coal fired in a 1 MW combustion research facility.

FIG. 11 is a graph showing $SO_2$ capture as a function of Ca/S ratios for 3% sulfur coal fired in a 1 MW combustion research facility when injecting a 75% solids slurry of 1.4 micron-sized ground $CaCO_3$. The slurry was diluted to 30% solids at the injection nozzle. Particle agglomeration was minimized by dilution and by generating spray droplets under 10 microns median size, preferably under 5 microns particle size.

Further in connection with improving $SO_2$ capture, it is known that humidifying the flue gas ahead of the electrostatic precipitator, to bring the dew point to within about 11° C. to about 17° C. of saturation, significantly enhances $SO_2$ capture. The moisture condenses on the fine ash and lime particles under those conditions to yield a liquid film that stimulates the acid/base reaction. The multiplicity of finely-sized particles achieved in the course of carrying out the processes of the present invention performs that function much more effectively than those relatively fewer, large agglomerates from dry powder that do manage to continue through the system to the cooler regions of the boiler. The present invention provides a more economical approach to enhanced $SO_2$ capture by similar amounts, about 15%, without the energy penalty for evaporating significant amounts of water. By capturing essentially all the $SO_3$, which eliminates the need to discharge the flue gas at temperatures safely above the acid dew point, it allows recovery of significantly more of the fuel energy that would otherwise be lost, while also improving $SO_2$ capture.

Other benefits of the minimally agglomerated fine particle reagent addition in accordance with the present invention include the capture of almost all of the $SO_3$, which allows lowering the boiler exit temperature without encountering the fouling and corrosion of cold end equipment by either ammonium bisulfate or sulfuric acid. Further, in addition to the net increase in system thermal efficiency and reduced maintenance, the lower temperatures and reduced gas flow will enhance both precipitator efficiency and fan capacity.

As was earlier noted, utilizing the deagglomerated reagent product that resulted from carrying out the present invention reduces the potential for ash deposits in the convective section of the boiler. The dramatic increase in the number of very fine CaO particles thus also significantly increases the chances of preventing corrosive attack of the high temperature tube surfaces by semi-molten ash particles. The net effect is to make those ash particles less sticky, and therefore less prone to attach themselves to and to build up on the surfaces of the heat exchange tubes.

Additionally, utilizing the processes in accordance with the present invention will result in the dust collector burden to be about half that experienced in known processes utilizing −325 mesh lime or limestone. Because $CaSO_4$ is less detrimental to precipitator performance than is free CaO, the significant increase in CaO utilization realized with the present invention serves to minimize the adverse impact on the precipitator performance as compared with utilizing a larger particle size limestone injection. As mentioned above, air heater fouling and corrosion is also minimized, allowing the lowering of the flue gas exit temperature, which improves the system heat rate and also reduces gas volume to the precipitator, and which also enhances precipitator efficiency and reduces fan power demand. The total solids burden (ash+$CaSO_3$ or $CaSO_4$+CaO) and the operating specifications of the particular electrostatic precipitator will determine if the advantages of reduced gas volumes and reduced ash temperatures are sufficient to offset the disadvantage of higher resistivity on the particular precipitator, and will influence whether supplemental dust treatment or collection capacity is needed.

It is known that increasing the sub-micron fraction of the dust burden can have both positive and negative impacts on the operation of the ESP. Moderate increases in the number of small charged particles increase the electric field close to the electrode, which will improve particle collection of all particle sizes. If the number of particles smaller than 1 micron is too large, the ESP current will be reduced to the point where charging and collection is not as effective. Thus, for any given boiler-ESP combination, a balance would have to be struck between the amount and size of the fine particles employed to capture $SO_2$ in the ESP with maximum efficiency, while limiting the number of sub-micron particles to that amount that will enhance rather than inhibit particulate collection performance. Alternatively, to achieve those same positive impacts on the ESP, one can target a more optimal $SO_x$ capture that can be achieved with sub-stoichiometric injection. Another alternative is to employ a commercially available ash conditioning system that agglomerates the fine ash particles. Still another option is to either supplement the ESP or displace it with a bag house. The bag house will provide additional flue gas reagent contact time and increase pollutant capture efficiency.

The calcium chemicals that are injected into the combustion zone to capture $SO_x$ and toxic metal pollutants can impede the collection of particulate emissions in some electrostatic precipitators. But by slightly modifying the composition of the injected chemicals, the negative impact of the calcium-based chemicals can be mitigated, and the performance of the ESP can be enhanced. In that regard, co-injecting small amounts of alkali compounds to counteract the adverse impacts of the calcium-based reagents was not previously recognized as an option to address that problem. Instead, the previous approach focused on providing additional systems, such as humidifiers, and ammonia plus $SO_3$ ash conditioning equipment, which presents retrofit problems and increases the capital costs in older systems.

As was earlier noted, in addition to improved $SO_2$ capture efficiency of the furnace injection system, the present invention involving the injection into the high temperature combustion zone of significantly finer reagent particle sizes yields more effective $SO_x$ capture at treatment ratios that are much closer to stoichiometric than those achieved previously. That allows the power plant is operator to lower the furnace exit gas temperature, which decreases the flue gas volume and velocity through the ESP, and increases the particulate capture efficiency of the ESP, and/or the scrubber if there is one. The lower exit gas temperature is dependent upon neutralizing any $SO_3$ present in order to avoid fouling and corrosion. That temperature reduction can be achieved by heat exchange in new installations, by retrofitting the air heater, or by spray cooling in retrofits, such as is disclosed in U.S. Pat. No. 4,559,211. Those changes will likely require retuning the boiler by changing the distribution of the hotter combustion air between the coal mills and the various combustion air flows, primary and secondary.

If the system temperature can be lowered, such as by turning off steam-fed air preheater coils, and by utilizing an oversized ESP, those factors together with the reduced ash burden afforded by the more efficient $SO_2$ capture technology disclosed herein can be sufficient to ensure compliance with particulate emission requirements. If such temperature lowering capability does not exist in a particular power plant, spray cooling can be implemented by incorporating a humidification system and sacrificing some energy efficiency. That approach was used in the Limestone injection Multiple Burner (LIMB) demonstrations that were funded by the U.S. Department of Energy and reported in the earlier-identified Nolan paper. But that technology has not been implemented, largely because of the poor reagent utilization efficiency. A better option involves providing additional heat exchange capacity to bring temperatures near the water dew point. The latter approach will further enhance the $SO_2$ capture by the CaO produced during high-temperature combustion zone furnace injection.

Another way to address the ESP capture efficiency issues encountered when injecting calcium-based chemicals involves the injection of various additional chemicals into the lower temperature regions of the boiler, rather than into the higher temperature regions. That approach serves to modify the electrical characteristics of the ash, and is disclosed in U.S. Pat. No. 4,306,885. It includes the injection of gases such as $SO_3$ and $NH_3$, combinations of those gases, and various ammonium and sodium phosphorus compounds. However, the addition of sodium compounds to the fuel is generally discouraged because most such compounds are relatively low melting and can cause serious slagging or fouling in the high temperatures regions of the boiler. Consequently, injection of such compounds into the flue gas stream at temperatures below about 900° C. is specified. However, such additions, whether gaseous, liquid, or solid require investment in and maintenance and operation of separate feed equipment. The quantities of the various chemicals needed are generally quite small relative to the amount of ash or coal fired, i.e., in the range of about 10 lb/ton ash and about 1 lb per ton of coal, respectively, for a 10% ash-containing coal. Ideally, the simplest mode of supplying the ash conditioning reagent is to incorporate it in or to co-inject it with the limestone dispersion at the higher combustion zone temperature. There are a number of alkali compounds capable of modifying ash electrical properties that are high melting and suitable for incorporation in or co-injection with the limestone dispersion. They include sodium and potassium phosphate (tribasic), lithium silicate, and the aluminates of all three major alkali metals (Na, K, and Li). The phosphates are believed to provide an agglomerating effect downstream to offset the resistivity modifications that result from the introduction of the calcium compounds Another way of supplying the needed alkali to condition the $CaSO_4$ product of the capture of $SO_x$ by stone-derived lime is to employ alkali-containing surfactants, such as sodium, potassium, or lithium polyacrylates, as dispersants in the preparation of the stone slurry. The quantity of dispersant employed will vary with the solids loading and particle size of the suspension, but it should be in the range of from about 0.25% to about 2.0% of the product, by weight The amount of alkali contributed to the $CaSO_4$ conditioning will vary with the surfactant composition. It is likely to be sufficient to have a conditioning effect, but it can be supplemented with the other materials if more conditioner is needed.

The amount of the $CaSO_4$ conditioning agent to be added is in the range of from about 0.005% to about 5% of the weight of the injected stone. Because the alkalis that are the actual slagging agents represent less than 30% to 50% of the conditioning reagent by weight, the total supply of deposit formers is far less than the 3% or 4% sodium "rule of thumb" slagging threshold for boilers. Treatment rates will be dependent on the relative quantities of sulfur and ash in the fuel, the stoichiometric efficiency of the limestone, which is a function of particle size, the effectiveness of the distribution upon injection, and the design and condition of the ESP. It should be noted that from a practical operating standpoint, the quantities of alkali added with the ash conditioning agents is well below the levels at which they actually pose slagging problems, and that the CaO resulting from the stone injection tends to mitigate any slagging problems.

A further beneficial result of utilizing the processes disclosed herein is better carbon burnout because of the resulting cloud of fine, reflective CaO particles, which also allow for modest reductions in excess air, and result in reduced $NO_x$ formation and increased unit heat rate. A previous report by the inventor disclosed some such benefits from the injection of a coarser, 3 micron $Mg(OH)_2$ dispersion, but the use of the much finer size particles and the larger reflective cloud to restore the marketability of high LOI ash was not envisioned. The reduction of unburned carbon in the ash from as much as 16% to under 5% restores the marketability of the ash.

Still another benefit of the present invention is a dramatically lower $CO_2$ release per unit of $SO_2$ captured. The higher stone utilization of the present invention brings the emissions when utilizing the advanced and improved furnace sorbent injection technology of the present invention to about 2.5 tons $CO_2$ per ton $SO_2$, close to the 0.7 tons $CO_2$ per ton $SO_2$ achieved in a wet limestone scrubber. That result compares with nearly 14 tons $CO_2$ per ton $SO_2$ for the previous furnace injection approaches. Those numerical values take into account both the $CO_2$ released from the stone and that from the fuel that is used to calcine it. Clearly, to the extent that finely-ground ash can take the place of limestone, the $CO_2/SO_2$ ratio will be that much closer to that for limestone scrubbers. The reduction in $CO_2$ emissions achieved by lowering the flue gas exit temperature, and the other efficiency gains discussed previously, will more than offset the $CO_2$ increases from the use of $CaCO_3$.

Another difference between the invention as disclosed herein and previously-disclosed approaches is the ability to provide a truly multipollutant FSI process by grinding the stone or ash in a weak ammonium solution, such as urea, along with a surfactant, such as ammonium polyacrylate or ammonium sulfonate, to facilitate high solids loading. The inherent stability of a fine-particle-size $CaCO_3$ together with the reduced settling afforded by the high solids, overcomes the handling and pluggage problems that were encountered in previous attempts to combine −325 mesh stone and ammonium solutions. The addition of urea, even though in a small amount, could necessitate a substitution of ammonium polyacrylate for the sodium polyacrylate dispersant in order to assure a stable, handleable dispersion.

On FGD-equipped systems where the capture of $SO_3$ and toxic metals, rather than $SO_2$, are the primary objectives, magnesium chemicals have been preferred because they do not compete for the $SO_2$ pollutant, thereby permitting much lower dosage. However, very fine ash particles can be a better option than, or a partial substitute for, magnesium compounds. For those objectives, low calcium ash can be size-reduced and injected after the economizers, instead of at the in-furnace transition from radiant to convective heat transfer near what is commonly referred to as the "nose" of the furnace. The "nose" is the region adjacent to the furnace outlet, where the heat transfer mechanism undergoes a transition from radiant heat transfer to convective heat transfer, as well as the superheaters and reheaters that make up the convective pass, and the economizer, where the incoming water is preheated before passing into the furnace heat exchange tubes for vaporization as steam. For purposes of this invention, the finely sized ash is injected through ports in the upper furnace wall, generally close to the furnace exit.

The above are the preferred treatment options on systems that include scrubbers, because the total quantities of reagent required are significantly less. However, those compounds do not operate to scavenge $SO_2$ from the flue gas stream, which instead is carried out in the scrubber. If the ash has a significant calcium content, which can be present naturally or can be added, it can optionally be introduced into the furnace combustion zone to scavenge $SO_2$ in systems that do not include scrubbers, or into scrubbers that need upgrading to meet new tighter emission control requirements.

The preparation of suitable finely-sized ash particles is influenced by the ash chemistry, by the emissions control systems that are present, and by which pollutants are being addressed. If the plant has existing FGD capability and the objectives are primarily the control of $SO_3$ and toxic metals, the preparation involves withdrawing a small fraction of the total ash, less than about 5%, from the collection hoppers, passing it through a jet mill or other type of mill to reduce the particle size of the ash to a micron or less, and then discharging the mill output back into the boiler or ducts. The solubilization and reprecipitation size reduction technique can also be applied to process the high lime fraction of high calcium content ash, either with or without wet milling of the insoluble component.

The quantity of ash that is of reduced particle size can be small because the $SO_3$ and toxic metals concentrations in the flue gas stream are in the low ppm range, and also because reducing a 20 micron particle to 0.5 micron size increases the number of particles by more than 61,000 times and also multiplies the surface area by factor of 40. Because the increase in ash burden is small, the impact on the performance of the particulate control device will generally be manageable. Media mills (wet or dry) are viable alternatives to the jet mill, which can be powered by steam or air. In many instances, a steam-powered jet mill is preferable to a compressed air system because steam is readily available and is less expensive at a power plant, and also because the moisture injected would enhance acid adsorption and help ESP performance. Wet systems are slightly more cumbersome and could pose a very minor heat rate penalty.

The result of utilizing the finely-sized particles provided by the present invention includes a dramatic increase in ash particles, and consequently in ash surface area, thereby providing enhanced adsorption of the $SO_3$ and of toxic metals. That result is achieved at a low energy cost and at a relatively low capital investment, while simultaneously eliminating or significantly reducing the need for purchased chemicals. Increased ash surface area will not only enhance $SO_3$ adsorption, it will also stimulate more acid neutralization as a result of the alkaline materials present in the ash. In the few instances where the adsorbed acid inhibits constructive use of the ash, adding a modest limestone supplement to the mill input material would suffice. Costs can be offset or converted into a net benefit because the capture of the $SO_3$ will reduce corrosion and fouling, and will make it feasible to lower the air heater exit temperature, thereby increasing fuel efficiency.

Grinding ash from the economizer hopper, or bottom ash, is preferable to utilizing ash from the precipitator hopper, because the economizer ash is less likely to have accumulated adsorbed pollutants, which avoids recirculation of contaminated ash and potential increase of pollutant concentrations in the flue gas stream. For power plants without high efficiency FGD systems, the ground ash can be injected into the furnace region to scavenge $SO_2$ if the ash has a significant CaO content. For a 1% sulfur-content coal and about 10% ash having a CaO content of about 12.5% would provide about 70% of the stoichiometric quantity that would be needed. Thus, many Midwestern coals with below stoichiometric CaO levels in the ash can still be beneficial, while Western coals with high CaO content could be more useful, if they were readily available.

Previous efforts at capturing undesirable pollutants have focused on adding purchased chemicals that have or yield a high surface area needed to absorb the $SO_3$ and toxic metals. In utilizing ash, the present invention, in contrast, utilizes what is normally a waste product or low value byproduct of the power plant in order to reduce the need to purchase supplemental reagents.

Another aspect of pollution control of carbonaceous-fuel-fired combustion systems, primarily coal-fired facilities, is the matter of protection of the selective catalytic reactors (SCR's) from what has been referred to as "arsenic poisoning." Experience has shown that typical catalyst life in systems burning a wide range of coals is only about three years. Not only is catalyst replacement expensive (amounting to millions of dollars), but $NO_x$ reduction performance deteriorates steadily over that time period. Many coals, particularly Eastern U.S. coals, contain significant amounts of arsenic. The arsenic in the coal forms gaseous $As_2O_3$ as one of the products of combustion, which causes a reduction in the activity of the catalyst for its intended purpose of reducing $NO_x$ emissions Because the replacement of SCR catalysts is an expensive undertaking, it is therefore desirable to capture as much of the gaseous $As_2O_3$ as solid particulates as is possible before the arsenic-based vapor comes into contact with the catalyst, and before it is emitted to and pollutes the environment. Catalyst suppliers currently recommend adding sufficient limestone, either as rock or as powder, on the coal supply belt to bring the CaO content of the ash to at least 3%. Depending upon the mineralogy of the ash, that can involve a considerable limestone addition rate, a significant feed system investment, and significant ash disposal problems.

When $CaCO_3$ is introduced into the furnace in the slurry form as described earlier herein to provide the ultra-fine CaO particles for capturing $SO_2$, those particles are also useful for capturing the $As_2O_3$. Other compounds, such as those yielding ZnO upon thermal decomposition, can also be effective, but are likely to be more costly. But when CaO is utilized as the capture medium, a greater amount of reagent is required because of the propensity of CaO to also capture the $SO_2$. Thus, that portion of the CaO particles that effectively captures the $SO_2$ in the combustion products by combining with the $SO_2$ is therefore unavailable to react with the $As_2O_3$, resulting in a lower $As_2O_3$ capture effectiveness and a need to employ higher reagent dosages to protect the SCR catalyst than would be needed with other high-surface-area adsorbents. Similarly, the "overbased" form of reagent can be much more effective than the ground or precipitated types in capturing the toxic metals that are usually present in the ppb range, because of the far greater number of available reactive particles per pound. The choice of reagent type, or combinations thereof, is an economic decision based on whether the lower dosage of the overbase is sufficient to offset its 4 or 5 times higher cost per unit weight.

Unlike CaO, however, MgO does not readily capture $SO_2$. Consequently, when $MgCO_3$ or $Mg(OH)_3$ is introduced in slurry form to provide fine MgO particles, there is little competition for the MgO between the $SO_2$ and the toxic metals. As a result, the quantity of reagent required to capture the arsenic is orders of magnitude less with the magnesium compounds. That is true even though the chemical has the additional benefit of reducing fouling and ESP problems. Further, much of the $SO_3$ that is formed in the SCR will also be captured, which thereby serves to minimize the visible plume problem often incident to SCR/scrubber-equipped combustion systems. Thus the choice between Ca and Mg for arsenic capture depends upon the plant's objective and the site conditions.

In addition to the desirability of capturing the arsenic to minimize catalyst poisoning, it is also desirable to capture the toxic metal mercury. In that regard, the mercury that is present in the combustion products from Eastern coals is in the more readily sorbed salt form. In the Western coals, on the other hand, the mercury tends to be present in the more difficult-to-capture elemental form. One way to capture the mercury that is present in Western coals, as well as in low-chloride-content Eastern coals, is to introduce with the coal modest amounts of chloride or of other oxidizing compounds, such as ozone or peroxides, to facilitate the mercury capture. The chloride addition allows the conversion of elemental mercury to a salt that can be captured in the dust collectors of the coal-fired plants.

The introduction of chlorides or other oxidizing compounds is especially desirable when Western U.S. coals are utilized, because they have a lower intrinsic chloride content. To date, most applications have involved adding the chloride on the coal supply belt. But the additional chloride can be more effectively provided by adding it to the carbonate dispersion discussed earlier, which is injected into the combustion zone of the furnace. Chloride can be introduced to increase the equivalent effective chloride level to approximate that in Eastern coals, about 0.5% chloride by weight of coal, but better distribution of the chloride in the gas stream in the combustion zone should achieve the mercury oxidation with less chemical than is needed to be applied to the coal supply belt. The chloride can also be added separately at the point of the slurry injection and in the form of a salt solution. For example, at the equivalent of a $MgCl_2$ addition rate of 500 ppm on coal, the $MgCl_2$ would be only about 0.8% of the weight of the $CaCO_3$ that would be needed to capture a significant amount of $SO_2$ at a Ca/S ratio of 1.5. Such a small amount could allow incorporation of the chloride salt in the dispersion without adversely impacting the stability of the carbonate dispersions. Including the chloride salt in the dispersion can also provide a modest degree of freeze protection.

On the other hand, the stability of the dispersion composition can be adversely impacted by the addition of chloride to the dispersion. One way to avoid a dispersion stability problem is not to incorporate the chloride in the dispersion directly, but to provide dual feeds to the injection ports, one feed being the carbonate dispersion and the other feed being the chloride. Another approach is to combine the carbonate dispersion with urea to be able to provide in a single solution a true multi-pollutant-capturing product. The combination will require a reformulation of the slurry to adjust for the incompatibility of the sodium-based dispersants and urea, and could necessitate a change from a sodium polyacrylate dispersant to another dispersant, such as ammonium polyacrylate, in order to assure a stable dispersion.

Whether the chloride is present in the fuel or is added as an alkaline chloride, it is needed to oxidize the Hg so it can be captured. However, the result is a byproduct of HCl vapor, which needs to be captured before discharging the flue gas. Since there is likely to be some competition for the calcium oxide between HCl and $SO_3$, $SO_2$, and Hg, if calcium is injected in the furnace for $SO_x$ control, it is advisable to shift some part of the injection downstream to facilitate HCL capture, since $CaCl_2$ has been reported to be unstable at temperatures above 800° C.

It will therefore be apparent that the present invention provides significant flexibility and advantages in connection with the control and the capture of undesired $SO_x$, $NO_x$, and acids, as well as toxic metals emissions, when it is utilized in carbonaceous-fuel-fired combustion systems.

A first advantage of the present invention is that the practice of the disclosed invention results in a significant reduction of the discharge of undesirable pollutants. That reduction is achieved with relatively simple, relatively low cost equipment, and is effected within the furnace by the reaction of the pollutants with a particulate material, or the adsorption of the pollutants on the surface of a particulate material. The disclosed particulate materials that achieve the control of undesired emissions can be derived from limestone, calcium-containing wastes or byproducts, coal ash, and combinations thereof. Those materials are relatively inexpensive, and their preparation as finely-sized dispersions in the manner described herein avoids the high costs associated with ultra-fine, dry grinding of limestone. Moreover, the pollutant removal efficiency provided by a large number of unagglomerated, very-finely-sized particles is not dependent upon the existence of particles having pores, as in some previously disclosed approaches. And as earlier noted, the pores of such porous particles can easily become plugged, which thereby reduces the overall effective surface area of the particles for reaction by limiting the access of the gaseous or vaporized pollutants to the inner core regions of the porous particles. Because of the resultant reduction of available overall effective porous particle surface area, the pollutant capture effectiveness of such previous processes is significantly reduced.

A second advantage of the disclosed invention is that it results in increased combustion efficiency and reduced $CO_2$ emissions from combustion systems lacking environmental controls. Consequently, the quantity of unburned carbon that is otherwise normally contained in the ash is reduced by the reflectivity of the cloud of oxide particles released by injection of the finely ground reagent dispersion. And the combustion process requires less excess combustion air, thereby reducing $NO_x$ emissions. It also results in minimizing ash fouling in the furnace, as well as reducing the deposition of ammonium bisulfite or sulfuric acid in the air preheater.

A third advantage of the disclosed invention is that it provides a low-capital-cost process that permits economical stripping of $SO_x$ and toxic metal pollutants from combustion gas streams. It also enhances combustion along with the other pollutants. Furthermore, the resulting combustion gas stream cleanup can be achieved with fewer undesirable side effects, such as hard-to-handle ash deposits, overburdened dust collectors, visible stack plumes, and the like. And the hard piping and safety devices required when overbased compounds (oil-based magnesium compounds) are utilized are therefore rendered unnecessary.

In summary, the disclosed invention provides new, more effective furnace sorbent injection methods that can be combined with other pollution control techniques as process enhancements.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A process for controlling combustion system emissions from combustion systems in which a carbonaceous-fuel is combusted, said process comprising the steps of:

introducing a carbonaceous fuel and air into a furnace to provide a combustible fuel/air mixture and combusting the fuel/air mixture at a furnace combustion region to provide combustion products in the form of flue gases containing pollutant compounds including $SO_x$, Hg, As, and $CO_2$, wherein the temperature within the furnace combustion region is from about 2500° F. to about 3000° F.;

introducing into the furnace combustion region a calcium-containing reagent to expose the calcium-containing reagent to the furnace combustion region temperature to thereby calcine the calcium-containing reagent within the furnace combustion region into a plurality of calcium oxide particles to provide a scavenging agent in particulate form for scavenging combustion product components, wherein the calcium oxide particles are in the form of a plurality of discrete, substantially non-agglomerated calcium oxide particles having a particle size of less than about 3 microns;

contacting the calcium oxide particles with the combustion products to react the calcium oxide particles with pollutants contained in the combustion products to capture $SO_x$ and toxic metals that are present in the combustion products; and transporting the flue gases and particles from the combustion region and through the furnace to a furnace exit.

2. A process in accordance with claim 1, including the step of preparing the calcium-containing reagent by providing a solution containing soluble calcium-containing compounds.

3. A process in accordance with claim 2 wherein the soluble calcium-containing compounds are selected from the group consisting of calcium bicarbonate, calcium chloride, calcium acetate, calcium formate, and mixtures and combinations thereof.

4. A process in accordance with claim 1, including the step of preparing the calcium-containing reagent by providing calcium-containing compounds in powder form, wherein the powder is in the form of particles having a particle size of less than about 3 microns.

5. A process in accordance with claim 1, including the step of preparing the calcium-containing reagent by providing an aqueous slurry containing a suspension of calcium-containing compounds selected from the group consisting of calcium carbonate, calcium hydroxide, calcium oxide, coal ash, and calcium-containing byproducts or wastes, and mixtures and combinations thereof, wherein the slurry has a solids content of from about 20% to about 85% by weight and the calcium-containing compounds in the slurry are distinct, individual, substantially agglomerate-free particles having a median particle size of less than about 2 microns.

6. A process in accordance with claim 5, including the steps of: spray drying the slurry to provide solid calcium-containing particles; and milling the solid calcium-containing particles to reduce the particle size of agglomerates that are present after spray drying.

7. A process in accordance with claim 5, including the step of separating the aqueous slurry into a first portion for injection into the furnace combustion region and a second portion for injecting into an upper, cooler region of the furnace to capture HCL that is present in flue gases in the upper region of the furnace.

8. A process in accordance with claim 5, including the step of providing for inclusion in the aqueous slurry finely-ground calcium-containing compounds that are ground in an aqueous medium to provide particles having a surface area of from about 4 $m^2$/gm to about 20 $m^2$/gm.

9. A process in accordance with claim 8, including the step of grinding the calcium-containing compounds in a media mill in the presence of a dispersant selected from the group consisting of anionic surfactants, sodium salts of a polycarboxylic acid, and polyacrylates.

10. A process in accordance with claim 9, wherein the dispersant is present at a concentration of from about 0.20% to about 5% by weight.

11. A process in accordance with claim 9, wherein the concentration of the dispersant in the slurry is from about 0.25% to about 1.5% by weight.

12. A process in accordance with claim 5, wherein the aqueous slurry contains from about 20% to about 84% calcium-containing solids by weight.

13. A process in accordance with claim 5, wherein the slurry is injected in the form of droplets having a median size of about 10 microns.

14. A process in accordance with claim 5, including the steps of preparing the slurry of particles of calcium-containing compounds by providing at least one of calcium hydroxide and calcium oxide particles; solubilizing the particles by bubbling $CO_2$ through the slurry in the presence of at least one of an anionic surfactant, a salt of a carboxylic acid, and a sulphonic acid to form soluble calcium bicarbonate; and reprecipitating the soluble calcium bicarbonate as carbonate particles having a particle size of from about 70 to about 400 nanometers.

15. A process in accordance with claim 5, wherein the calcium oxide particles are present at a stoichiometric ratio of Ca/S of from about 0.5 to about 2.5 based upon a sulfur content of the fuel.

16. A process in accordance with claim 5, including the step of injecting into flue gas in regions of the furnace at which temperatures are below about 900° C. an ash conditioning agent selected from the group consisting of $SO_3$ and $NH_3$ gases, ammonium compounds, and sodium phosphorus compounds for improved performance of a downstream precipitator.

17. A process in accordance with claim 5, including the step of injecting into the combustion region of the furnace along with the aqueous slurry an ash conditioning agent selected from the group consisting of sodium phosphate potassium phosphate, lithium silicate and alkali metal aluminate compounds.

18. A process in accordance with claim 5, including adding to the aqueous slurry an ash conditioning agent selected from the group consisting of sodium, potassium, or lithium polyacrylates to serve as a dispersant and in the amount of from about 0.25% to about 2.0% by weight of the slurry for improved performance of a downstream precipitator.

19. A process in accordance with claim 5, including the step of grinding the calcium-containing compounds prior to preparation of the aqueous slurry in a weak urea solution along with a surfactant selected from the group consisting of ammonium polyacrylate and ammonium sulfonate.

20. A process in accordance with claim 5, including the step of injecting through ports in an upper wall of the furnace adjacent to a furnace exit finely sized ash particles to capture $SO_3$ and toxic metals.

21. A process in accordance with claim 5, wherein the aqueous slurry is provided in a quantity sufficient for capturing $SO_2$ and gaseous $As_2O_3$ that are present in the combustion products.

22. A process in accordance with claim 5, including the step of adding an oxidizing compound to the aqueous slurry for converting elemental mercury present in the carbonaceous fuel to a mercury salt for capture of the mercury salt at a point downstream of the furnace.

23. A process in accordance with claim 22, wherein the oxidizing compounds are selected from the group consisting of peroxides and ozone for oxidizing $SO_2$ to $SO_3$ for subsequent capture of the $SO_3$.

24. A process in accordance with claim 5, wherein the carbonaceous fuel is coal.

25. A process according to claim 5, including the step of finely grinding the calcium-containing particles in an aqueous medium for inclusion in the aqueous slurry.

26. A process according to claim 5, including the step of adding to the slurry a compound selected from the group consisting of alkali dispersants and high-melting-point alkali compounds to offset effects on electrostatic precipitators of alkaline earth scavenging agents for capturing $SO_2$.

27. A process according to claim 5, including the step of adding soluble chlorides to the aqueous slurry for oxidizing elemental mercury to enable mercury capture.

28. A process according to claim 5, including the step of adding to the aqueous slurry an alkali-containing surfactant as a dispersant for mitigating effects of free calcium oxide on electrostatic precipitator particulate capture performance, wherein the surfactant is selected from the group consisting of alkali metal polyacrylates and is added in an amount of from about 0.005% to about 5% of the weight of the calcium particles in the slurry.

29. A process according to claim 5, including the step of grinding the calcium-containing compounds in a weak ammonium solution along with an ammonium acrylate surfactant to facilitate high solids loading in the slurry.

30. A process according to claim 5, including the step of adding to the slurry at least one substance selected from the group consisting of an overbased calcium compound and an overbased magnesium compound in an amount of less than about 5% by weight of the slurry.

31. A process according to claim 5, including the steps of withdrawing ash from an ash collection hopper; reducing the ash to a particle size of less than about 1 micron; and injecting the reduced size ash particle into the combustion zone in an amount of about 5% by weight of the injected slurry to capture $SO_3$, arsenic, and mercury that are present in the flue gas.

32. A process in accordance with claim 1 for controlling combustion system emissions from combustion systems in which a carbonaceous-fuel is combusted, whereby the melting point of ash produced by combustion of the carbonaceous fuel is raised, and slagging and fouling of heat exchange surfaces and of furnace internal surfaces is reduced as compared with combustion systems in which no calcium-containing reagent is introduced into the furnace combustion region.

33. A process in accordance with claim 1 for controlling combustion system emissions from combustion systems in which a carbonaceous fuel is combusted, whereby ash produced by combustion of the carbonaceous fuel contains less than about 5% of unburned carbon.

34. A process in accordance with claim 33 including the steps of:
- withdrawing from ash collection hoppers calcium-containing ash resulting from combustion of the carbonaceous fuel;
- reducing the calcium-containing ash to particles having a particle size of at most about one micron; and
- introducing the ash particles into the furnace combustion region.

35. A process in accordance with claim 1 for controlling combustion system emissions from combustion systems in which a carbonaceous-fuel is combusted, said process including the step of: milling a calcium-containing coal to provide micron-sized particles to serve as calcium-containing reagent.

36. A process in accordance with claim 1, wherein the calcium oxide particles have a particle size of from about 70 nanometers to about 400 nanometers.

* * * * *